(12) United States Patent
Sakajo et al.

(10) Patent No.: US 9,442,894 B2
(45) Date of Patent: Sep. 13, 2016

(54) METHOD FOR WORD REPRESENTATION OF FLOW PATTERN, APPARATUS FOR WORD REPRESENTATION, AND PROGRAM

(71) Applicant: Japan Science and Technology Agency, Saitama (JP)

(72) Inventors: Takashi Sakajo, Kyoto (JP); Tomoo Yokoyama, Kyoto (JP)

(73) Assignee: JAPAN SCIENCE AND TECHNOLOGY AGENCY (JP)

( * ) Notice: Subject to any disclaimer, the term of this patent is extended or adjusted under 35 U.S.C. 154(b) by 0 days.

(21) Appl. No.: 14/427,148

(22) PCT Filed: Aug. 1, 2013

(86) PCT No.: PCT/JP2013/070939
§ 371 (c)(1),
(2) Date: Mar. 10, 2015

(87) PCT Pub. No.: WO2014/041917
PCT Pub. Date: Mar. 20, 2014

(65) Prior Publication Data
US 2015/0248377 A1  Sep. 3, 2015

(30) Foreign Application Priority Data
Sep. 14, 2012 (JP) .................. 2012-203601

(51) Int. Cl.
G06F 17/20 (2006.01)
G06F 17/50 (2006.01)

(52) U.S. Cl.
CPC .......... *G06F 17/20* (2013.01); *G06F 17/5009* (2013.01); *G06F 2217/16* (2013.01)

(58) Field of Classification Search
USPC ........................................ 704/1–10
See application file for complete search history.

(56) References Cited

U.S. PATENT DOCUMENTS

| 5,095,447 A * | 3/1992 | Manns ................. G01R 31/308 382/144 |
| 2003/0149727 A1 | 8/2003 | Jaschek et al. |
| 2005/0283357 A1* | 12/2005 | MacLennan ...... G06F 17/30616 704/4 |
| 2008/0147646 A1 | 6/2008 | Jaschek et al. |
| 2011/0200795 A1* | 8/2011 | Lammers ............... B82Y 10/00 428/195.1 |

OTHER PUBLICATIONS

PCT International Search Report, dated Apr. 14, 2013 in connection with PCT International Application No. PCT/JP2013/057623, with English translation, 3 pages.
Kaczynski T et al., entitled "Computational Homology," Applied Mathematical Sciences, vol. 157, 2000, 52 pages.
Obayashi S entitled "Fluid Informatics," first edition, Gihudo Shuppan Co., Ltd., Apr. 30, 2010, 40 pages.

(Continued)

*Primary Examiner* — Abul Azad
(74) *Attorney, Agent, or Firm* — Amster, Rothstein & Ebenstein LLP

(57) ABSTRACT

The present invention assigns, in order to form a word representation for a flow pattern in a multiply connected exterior domain having N holes topologically, any one of words that define two types of flow patterns that can be topologically applied to a simply connected exterior domain having a hole, and repeatedly assigns, to the assigned word, any one of words that define five types of operations that can be topologically applied to add a hole to the flow pattern, so that a word representation corresponding to the multiply connected exterior domain having N holes is formed.

11 Claims, 18 Drawing Sheets

(56) References Cited

OTHER PUBLICATIONS

Shirayama S et al., first edition, Maruzen Co., Ltd., May 25, 2006, 27 pages.

Sakajo T entitled "Point vortex dynamics in multiply connected domains (Mathematical analysis of the Euler equation : 100 years of the Karman vortex street and unsteady vortex motion," Jul. 21, 2011, 25 pages.

PCT International Search Report, dated Aug. 27, 2013 in connection with PCT International Application No. PCT/JP2013/070939, with English translation, 3 pages.
Darren Crowdy: "A new calculus for two-dimensional vortex dynamics", Theoretical and Computational Fluid Dynamics, Springer, Berlin, DE. vol. 24, No. 1-4, Apr. 20, 2009, pp. 9-24.
Tian Ma et al.: "Topology of 2D incompressible flows and application to geophysical fluid dynamics", RACSAM, Rev. R. Acad. Cien. Serie A. Mat, vol. 96(3) Dec. 31, 2002, pp. 447-459.
Supplementary European Search Report of EP 13837136 dated Apr. 14, 2016.

\* cited by examiner

US 9,442,894 B2

METHOD FOR WORD REPRESENTATION OF FLOW PATTERN, APPARATUS FOR WORD REPRESENTATION, AND PROGRAM

CROSS-REFERENCE TO RELATED APPLICATIONS

This application is a U.S. national phase of PCT Application No. PCT/JP2013/070939, filed Aug. 1, 2013, which claims priority to Japanese Application No. JP 2012-203601, filed Sep. 14, 2012, the contents of which are incorporated by reference herein.

FIELD

The present invention relates to a method for a word representation of a flow pattern, an apparatus for a word representation, and a program.

BACKGROUND

Conventionally, fluid simulations by large-scale numerical calculations are used, in addition to wind channel tests, in order to design an optimum structure in a flow field such as an ambient flow or a water flow.

For example, optimization technologies have been developed that repeatedly perform a fluid simulation for a structure while varying a design variable for the structure by simulated annealing, a genetic algorithm method, etc.

Furthermore, in recent years, algorithms and programs have been developed that can mathematically deal with topology for patterns of flow by constructing a mathematical model of a fluid, or the like.

CITATION LIST

Non Patent Literature

Non Patent Literature 1: Tomasz Kaczynski, Konstantin Mischaikow, Marian Mrozek, "Computational Homology" Spinger, 2000.

SUMMARY

Technical Problem

Conventional methods of optimizing structure designing, however, have a problem in that the large-scale calculations that are performed repeatedly lead to increases in calculation time and designing costs and, due to the restrictions from them, the search area has to be limited and a possibility that the calculated optimum structure is optimum locally cannot be excluded. In other words, conventionally, there is a problem in that which search area is selected has to depend on the engineer's experiences and intuition and accordingly the result of optimization of the structure to be derived depends on which area is set for the search area.

The present invention was made in view of the above-described problem, and an object of the present invention is to provide a method for a word representation of a flow pattern, an apparatus for a word representation, and a program that allows, when a structure in a flow field is designed, to easily deal with flow patterns that can be applied to the structure without depending on experiences or intuition.

Solution to Problem

It is an object of the present invention to at least partially solve the problems in the conventional technology. According to an aspect of the present invention, a method for a word representation of a flow pattern in a multiply connected exterior domain having N holes topologically includes: a pattern word assigning step of assigning any one of words that define two types of flow patterns that can be topologically applied to a simply connected exterior domain having a hole; and an operation word assigning step of repeatedly assigning, to the word that is assigned at the pattern word assigning step, any one of words that define five types of operations that can be topologically applied to add a hole to the flow pattern, so that a word representation corresponding to the multiply connected exterior domain having N holes is formed.

According to another aspect of the present invention, a method for a word representation of a flow pattern in a multiply connected exterior domain having N holes topologically includes: an operation word assigning step of repeatedly assigning any one of words that define five types of operations that can be topologically applied to add a hole to the flow pattern, so that a word representation corresponding to the multiply connected exterior domain having N holes is formed; and a pattern word assigning step of assigning, to the word that is assigned at the operation word assigning step, any one of words that define two types of flow patterns that can be topologically applied to a simply connected exterior domain having a hole.

According to still another aspect of the present invention, in the method for a word representation of a flow pattern described above, the pattern word assigning step assigns any one of words defining three types of flow patterns in total consisting of the two types of flow patterns that can be topologically applied to a simply connected exterior domain having a hole and a pattern without a source-sink pair in a doubly connected exterior domain having two holes.

According to still another aspect of the present invention, in the method for a word representation of a flow pattern described above, the three types of flow patterns in total are: 1) a pattern I with the source-sink pair and two ss-∂-saddle connections; 2) a pattern II with the source-sink pair, a saddle point, a homoclinic saddle connection connecting to the saddle point, and two ss-saddle connections; and 3) a pattern O without the source-sink pair.

According to still another aspect of the present invention, in the method for a word representation of a flow pattern described above, the pattern word assigning step includes: a I classification step of determining whether or not there is an ss-∂-saddle connection in a streamline diagram that can form the multiply connected exterior domain having N holes and assigning a word of the pattern I when there is an ss-∂-saddle connection; and a II/O classification step of determining whether or not there is an ss-saddle connection in the streamline diagram when there is no ss-∂-saddle connection at the I classification step, assigning a word of the pattern II when there is an ss-saddle connection, and assigning a word of the pattern O when there is no ss-saddle connection on the other hand.

According to still another aspect of the present invention, in the method for a word representation of a flow pattern described above, the five types of operations that can be topologically applied are: 1) an $A_0$ operation of replacing an ss-orbit with a saddle point, a homoclinic saddle connection connecting to the saddle point and enclosing a hole, and two ss-saddle connections; 2) an $A_2$ operation of replacing an ss-orbit with two ss-∂-saddle connections and two ∂-saddles at a boundary newly added; 3) a $B_0$ operation of replacing a closed orbit with two homoclinic orbits forming a figure eight with addition of a hole and a saddle point; 4) a $B_2$ operation of replacing a closed orbit with an orbit with a ∂-saddle connection connecting two ∂-saddles added at a boundary of a hole newly added; and 5) a C operation of newly adding two ∂-saddles at a boundary already with 2k (k>0) ∂-saddles and connecting the two ∂-saddles with a ∂-saddle connection to enclose a hole newly added.

According to still another aspect of the present invention, in the method for a word representation of a flow pattern described above, when assigning the words defining the five types of operations, the operation word assigning step: 1) assigns a word defining any one of the $A_0$ operation and the $A_2$ operation on condition that there is an ss-orbit; 2) assigns a word defining any one of the $B_0$ operation and the $B_2$ operation on condition that there is a closed orbit; and 3) assigns a word defining the C operation on condition that there is a boundary with ∂-saddles.

According to still another aspect of the present invention, in an apparatus for a word representation of a flow pattern in a multiply connected exterior domain having N holes topologically, the apparatus includes at least a control unit, and the control unit includes: a pattern word assigning unit that assigns any one of words that define two types of flow patterns that can be topologically applied to a simply connected exterior domain having a hole; and an operation word assigning unit that repeatedly assigns, to the word that is assigned by the pattern word assigning unit, any one of words that define five types of operations that can be topologically applied to add a hole to the flow pattern, so that a word representation corresponding to the multiply connected exterior domain having N holes is formed.

According to still another aspect of the present invention, in an apparatus for a word representation of a flow pattern in a multiply connected exterior domain having N holes topologically, the apparatus includes at least a control unit, and the control unit includes: an operation word assigning unit that repeatedly assigns any one of words that define five types of operations that can be topologically applied to add a hole to the flow pattern, so that a word representation corresponding to the multiply connected exterior domain having N holes is formed; and a pattern word assigning unit that assigns, to the word that is assigned by the operation word assigning unit, any one of words that define two types of flow patterns that can be topologically applied to a simply connected exterior domain having a hole.

According to still another aspect of the present invention, in a program for causing a computer including at least a control unit to execute a method for a word representation of a flow pattern in a multiply connected exterior domain having N holes topologically, the program causes the control unit to execute: a pattern word assigning step of assigning any one of words that define two types of flow patterns that can be topologically applied to a simply connected exterior domain having a hole; and an operation word assigning step of repeatedly assigning, to the word that is assigned at the pattern word assigning step, any one of words that define five types of operations that can be topologically applied to add a hole to the flow pattern, so that a word representation corresponding to the multiply connected exterior domain having N holes is formed.

According to still another aspect of the present invention, in a program for causing a computer including at least a control unit to execute a method for a word representation of a flow pattern in a multiply connected exterior domain having N holes topologically, the program causes the control unit to execute: an operation word assigning step of repeatedly assigning any one of words that define five types of operations that can be topologically applied to add a hole to the flow pattern, so that a word representation corresponding to the multiply connected exterior domain having N holes is formed; and a pattern word assigning step of assigning, to the word that is assigned at the operation word assigning step, any one of words that define two types of flow patterns that can be topologically applied to a simply connected exterior domain having a hole.

According to still another aspect of the present invention, a recording medium records the program described above.

Advantageous Effects of Invention

According to the present invention, in order to form a word representation for a flow pattern in a multiply connected exterior domain having N holes topologically, any one of words that define two types of flow patterns that can be topologically applied to a simply connected exterior domain having a hole is assigned, and any one of words that define five types of operations that can be topologically applied to add a hole to the flow pattern is repeatedly assigned to the assigned word, so that a word representation corresponding to the multiply connected exterior domain having N holes is formed. Accordingly, the present invention provides an advantage that it is possible to, without depending on experiences or intuition, easily deal with flow patterns that can be applied to a structure by using word representations. For example, in designing of a structure, such as a bridge, train, automobile, or airplane, assuming a uniform flow, it is possible, without depending on experiences or intuition, to derive all flow patterns that can be applied to the structure and confirm, according to matching of word representations, to which of all the patterns that can be applied a flow pattern corresponds. Accordingly, in structure designing, it is possible to know which area is covered. Furthermore, determining an optimum flow pattern in advance (e.g., a flow pattern allowing an enclosure in designing of an oil fence) from among all flow patterns that can be applied allows an efficient simulation in a proper area to carry out optimum designing.

According to the present invention, there is assigned any one of words defining three types of flow patterns in total consisting of the two types of flow patterns that can be topologically applied to a simply connected exterior domain having a hole and a pattern without a source-sink pair in a doubly connected exterior domain having two holes. Accordingly, the present invention provides an advantage that it is possible to easily deal with all flow patterns that can be applied, including a flow field assuming a uniform flow and a flow field without assuming a uniform flow.

According to the present invention, the three types of flow patterns in total are 1) a pattern I with the 1-source-sink and two ss-∂-saddle connections, 2) a pattern II with the 1-source-sink, a saddle point, a homoclinic saddle connection connecting to the saddle point, and two ss-saddle connections, and 3) a pattern O without the 1-source-sink. Accordingly, the present invention provides an advantage that it is possible to assign pattern words to all basic flow patterns and deal with a word representation of a specific flow pattern.

According to the present invention, whether or not there is an ss-∂-saddle connection in a streamline diagram that can form the multiply connected exterior domain having N holes is determined and a word of the pattern I is assigned when there is an ss-∂-saddle connection; and whether or not there is an ss-saddle connection in the streamline diagram is determined when there is no ss-∂-saddle connection, a word of the pattern II is assigned when there is an ss-saddle connection, and a word of the pattern O is assigned when there is no ss-saddle connection on the other hand. Accordingly, the present invention provides an advantage that it is possible to know easily which of the basic three types of flow patterns a flow pattern belongs to.

According to the present invention, the five types of operations that can be topologically applied are 1) an $A_0$ operation of replacing an ss-orbit with a saddle point, a homoclinic saddle connection connecting to the saddle point and enclosing a hole, and two ss-saddle connections; 2) an $A_2$ operation of replacing an ss-orbit with two ss-∂-saddle connections and two ∂-saddles at a boundary newly added; 3) a $B_0$ operation of replacing a closed orbit with two homoclinic orbits forming a figure eight with addition of a hole and a saddle point; 4) a $B_2$ operation of replacing a closed orbit with an orbit with a ∂-saddle connection connecting two ∂-saddles added at a boundary of a hole newly added; and 5) a C operation of newly adding two ∂-saddles at a boundary already with 2k (k>0) ∂-saddles and connecting the two ∂-saddles with a ∂-saddle connection to enclose a hole newly added. Accordingly, the present invention provides an advantage that it is possible to deal with a word representation of a specific operation when performing an operation of adding a topological hole to a flow pattern.

According to the present invention, when the words defining the five types of operations are assigned, 1) a word defining any one of the $A_0$ operation and the $A_2$ operation is assigned on condition that there is an ss-orbit, 2) a word defining any one of the $B_0$ operation and the $B_2$ operation is assigned on condition that there is a closed orbit, and 3) a word defining the C operation is assigned on condition that there is a boundary with ∂-saddles. This provides an advantage that it is possible to form a word representation limited to an operation that allows a topological operation.

DESCRIPTION OF EMBODIMENTS

An embodiment of a method for a word representation of a flow pattern, an apparatus for a word representation, and a program according to the present invention will be described in detail below according to the drawings. The embodiment does not limit the invention.

Particularly, in the following embodiment, an example will be descried where the present invention is applied to simulations for a two-dimensional fluid and, in addition to this case, the present invention can be applied similarly to any cross section (cross section of a structure, etc.) in simulations for a three-dimensional fluid.

Overview of Embodiment of Present Invention

Figure 1:
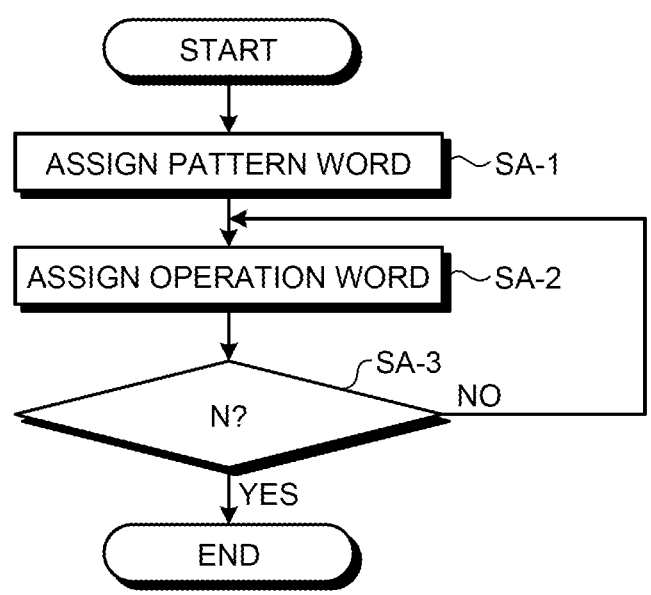
FIG. 1 is a flowchart showing an overview of the present embodiment.

An overview of the embodiment of the present invention will be described with reference to FIG. 1 and then the configuration, processing, etc. of the embodiment will be described in detail below. FIG. 1 is a flowchart showing the overview of the embodiment.

As shown in FIG. 1, in order to form a word representation of a flow pattern in a multiply connected exterior domain having N holes topologically, the embodiment assigns any one of words defining two types of flow patterns that can be topologically adopted in a simply connected exterior domain having one hole (step SA-1). The embodiment may assign any one of words (referred to as pattern words) defining three types of flow patterns in total, i.e., the above-mentioned two types of flow patterns and, in addition, a pattern without a 1-source-sink in a doubly connected exterior domain having two holes. For designing a structure in a closed water area, such as a lake without any uniform flow, only a pattern without a 1-source-sink in a doubly connected exterior domain having two holes may be used.

The embodiment assigns, to the words assigned at step SA-1, any one of words (referred to as "operation words") defining five types of operations that can be applied topologically to add one hole is added to a flow pattern (step SA-2) and repeatedly performs the processing at step SA-2 until the number of holes reaches N (step SA-3), thereby forming a word representation corresponding to the multiply connected exterior domain having N holes.

In the embodiment, the "multiply connected exterior domain" refers to a domain in a two dimensional space (plane) with multiple holes. The expression "hole" is a mathematical abstract expression, and various modes of expression may be applied. For example, when the flow on the surface of a river is focused on and, if there are multiple sandbanks or if bridge piers are stuck in, the domain thereof may be dealt with as a multiply connected exterior domain. Furthermore, a domain may be dealt with as a multiply connected exterior domain also in a case where there is an island in the ocean. In other words, the embodiment deals with a flow that is a "flow with multiple obstacles" as a flow in a multiply connected exterior domain. Furthermore, an independent vortex structure or a flow structure having a bounding closed orbit (an elliptic stationary point) is also referred to as a "hole".

According to the embodiment, assignment of word representations to the flow patterns allows topological classification of flows in a multiply connected exterior domain. "Topological" is a mathematical jargon indicating one geometric field referred to as topology. In traditional geometry, a triangle and a square are regarded as different figures because of their difference in the number of corners; however, from the viewpoint of topology, such detailed information is not focused on and a triangle and a square are regarded as the same diagrams from, for example, a viewpoint that, for example, an elastic band can be deformed to be switched between a triangle and a square. In other words, all polygons are regarded as the same as circles. On the other hand, if there is a circular domain in which one circle is taken out from another circle, because the circle and the circular domain cannot deform by deforming one elastic band, they are regarded as different diagrams. While, if the number of holes is different between multiply connected exterior domains, they are regarded as different diagrams, they are regarded as the same ones if only the holes have the same shape regardless whether the shapes of the holes are circular, rectangular, or segment. For this reason, what characterizes the domain of flow is only the number of holes and, accordingly, the embodiment represents a multiply connected exterior domain by $D_\zeta$ (M) for the number of holes M+1. For example, there is a simply connected exterior domain $D_\zeta$ (0) if there is only one hole, and there is a doubly connected exterior domain $D_\zeta$ (1) if there are two holes.

To deal with topological classification of flows, a certain specific structure that characterizes a flow (referred to as a "topological structure") is captured and, if there are two flows having the specific structure and if both of them cannot deform mutually due to continuous deformation of the specific structure (i.e., without taking out or adding), they are regarded as different flows. In such flow classification, the embodiment mainly deals with structurally stable flows. Structurally stable ones refer to flows whose specific topological structures do not change even if a small disturbance (clutter) is added to the provided flows. This puts a kind of limitation on all flow patterns that can occur; however, because the structurally stable flows are practically important, the limitation is not particularly problematic. This is because, in general, in a case where flows have been observed and the flows have been visualized using a calculator, observation errors and calculation errors are added and accordingly a flow structure not depending on such errors tends to be observed.

Descriptions of Components of Flows

The components of flows that are dealt with in the embodiment will be described here with reference to FIGS. 2 to 4. "Flows" according to the embodiment refer to incompressible flows. The incompressibility of fluid refers to the property that the volume does not change even if a force is applied. It is generally permissible to consider the flows of normal water or the atmosphere, when considered in the scale of normal life, in the frame of such flows. The present invention is not limited to this, and compressible flows may be dealt with in calculations.

The components of the flows that are dealt with in the embodiment are the following three components: obstacle, vortex, and uniform flow. Obstacles refer to holes in a multiply connected domain, and it can be derived from the general mathematical theory on fluids that, even if the shapes of the holes are regarded as circles upon topological classification, it does not have any effect on the given result mathematically. FIG. 2 is a diagram schematically showing structurally stable flow patterns. FIG. 2(C) schematically shows a boundary with four saddle points.

As shown in FIG. 2(a), vortex is a component that creates a flow rotating around the vortex. A uniform flow refers to, in a river current, a basic flow that is a flow across the domain. The component of the uniform flow is referred to as a 1-source-sink (see Mathematical Definition 2.1)

Expression 1

Definition 2.1. A point $p \in D_\zeta(M)$ is said to be an n-source-sink point, if $V|_{D_\zeta(M)\setminus\{p\}}$ is a vector field on $D_\zeta(M)\setminus\{p\}$ generated by a complex potential whose stream function is denoted by $\psi$, for which there is a pair of a neighborhood U of p and a homeomorphism h from U to the unit disk D with h(p)=0 such that $$\psi \circ h^{-1}|_{D\setminus\{0\}} = -\frac{\sin n\theta}{r^n}$$

in the polar coordinates associated with the disk D.

There is a reason for referring it not as a uniform flow but as a 1-source-sink. In order to explain the reason, some mathematical explanations will be given below. When there is a uniform flow, the assumed domain is a multiply connected exterior domain where multiple holes (obstacles) are buried in a plane that extends infinitely, which is difficult to deal with upon schematically representing the flow. For this reason, using a projection method referred to as stereographic projection in mathematics, the plane is projected onto a sphere. In this case, the point at infinity on the plane can correspond to the North Pole on the sphere and the origin can correspond to the South Pole.

Figure 2:
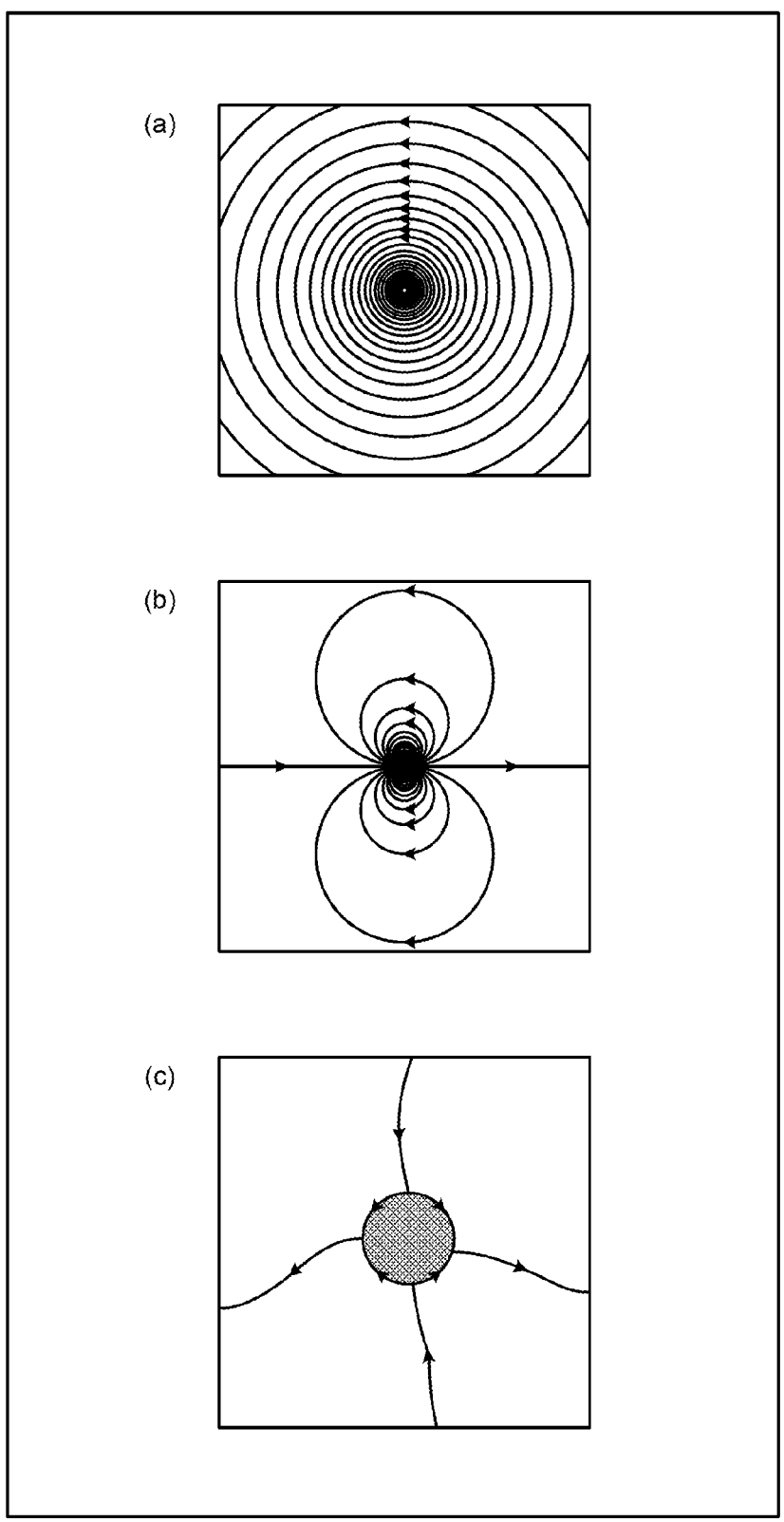
FIG. 2 is a diagram schematically showing structurally stable flow patterns.

Accordingly, the uniform flow has a flow structure of a pair of a source and a sink of the flow at the North Pole on the sphere, and it can be mathematically represented that it corresponds to a flow field such as that shown in FIG. 2(b). Furthermore, in order for a further schematic representation, because the positions of the North Pole and the South Pole can be shifted properly by utilizing the highly symmetrical shape of the sphere, when re-projection into the plane is performed by stereographic projection after the point at infinity is positioned at the South Pole and the center of a circular hole (obstacle) is positioned at the North Pole, a flow such as that shown in FIG. 2(b) is formed near the origin corresponding to the South Pole. Furthermore, because the circular boundary with its center at the point at infinity is projected into an exterior circular boundary on the plane, the flow field over the plane can be resultantly represented in a bounded domain in a shape such as that shown in FIG. 2. Accordingly, a representation such as that shown in FIG. 2 via the proper projection method is equivalent to flows with a uniform flow in the whole plane. In the descriptions of the embodiment, flows are represented in the drawings using such a projection method because it is useful to schematically show flows.

Figure 3:
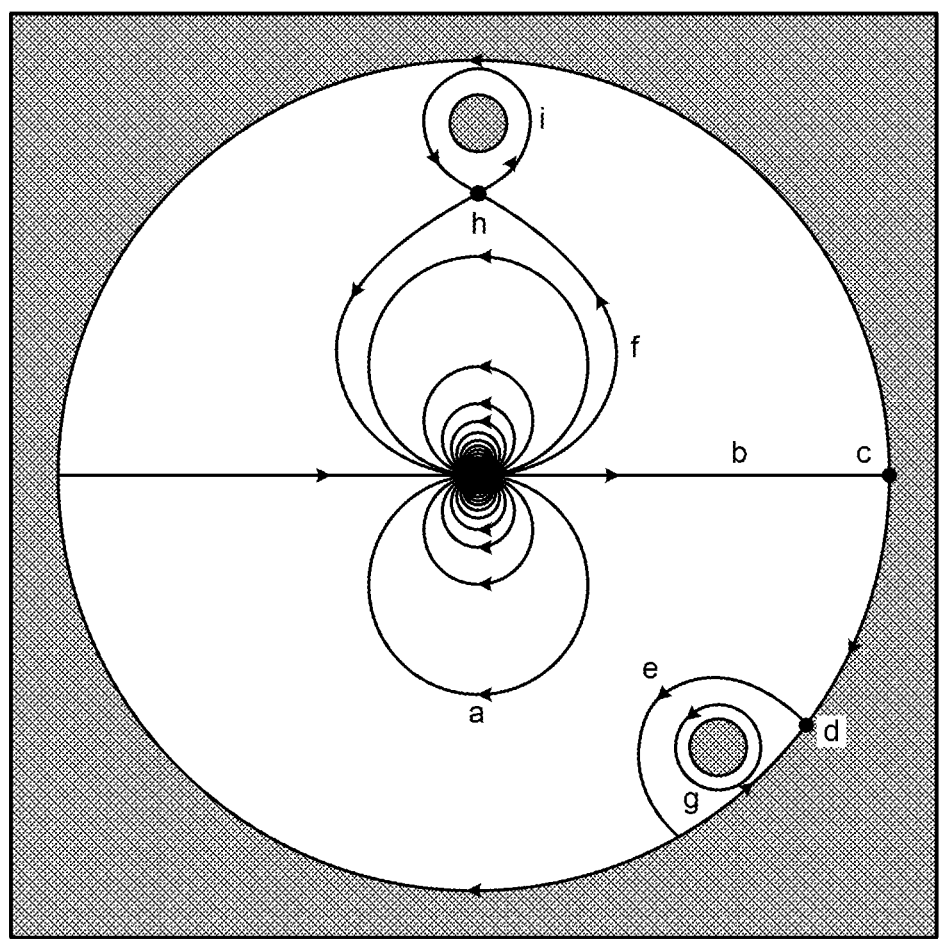
FIG. 3 is a diagram illustrating all characteristic orbits (streamlines) to perform topological classification of structurally stable flows in a domain.

FIG. 3 is a diagram illustrating all characteristic orbits (streamlines) to perform topological classification of structurally stable flows in such a domain. Orbits departing from and returning to a 1-source-sink as shown in FIG. 3(a) are referred to as ss-orbits. An orbit departing from the 1-source-sink and connecting onto a boundary as shown in FIG. 3(b) is referred to as an ss-∂-saddle connection, and a point on the boundary to which the orbit connects as shown in FIG. 3(c) is referred to as an ss-∂-saddle.

An orbit departing not from the 1-source-sink but from a point at the boundary and connecting to a point at the same boundary as shown in FIG. 3(e) is referred to as a ∂-saddle connection, and a point on the boundary thus connected as shown in FIG. 3(d) is referred to as a ∂-saddle. A point not on the boundary as shown in FIG. 3(h) is referred to as a saddle point, and an orbit departing from the 1-source-sink and connecting to the saddle point as shown in FIG. 3(f) is referred to as an ss-saddle connection. A closed curved orbit going around a boundary and the circumference of a vortex as shown in FIG. 3(g) is referred to as a closed orbit, and an orbit departing from and returning to the saddle point as shown in FIG. 3(i) is referred to as a homoclinic saddle connection. It can be mathematically proved that target structurally stable flows can be only represented by combinations of these orbits. can be only represented by combinations of these orbits.

In the embodiment, at the above-described step SA-2, a hole and the structure involved is added to the flow of a multiply connected exterior domain $D_\xi$ (M−1), thereby inductively constructing a structurally stable flow field of a multiply connected exterior domain $D_\xi$ (M) with an additional hole. For this reason, one serving as an initial structure of an inductive configuration for a simply connected exterior domain $D_\xi$ (0) or a doubly connected exterior domain $D_\xi$ (1) is assigned at step SA-1., Specifically, the above-descried three types of flow patterns in total are:
1) a pattern I with a 1-source-sink and two ss-∂-saddle connections,
2) a pattern II with a 1-source-sink, a saddle point, a homoclinic saddle connection connecting to the saddle point, and two ss-saddle connections, and
3) a pattern O without a 1-source-sink.

Figure 4:
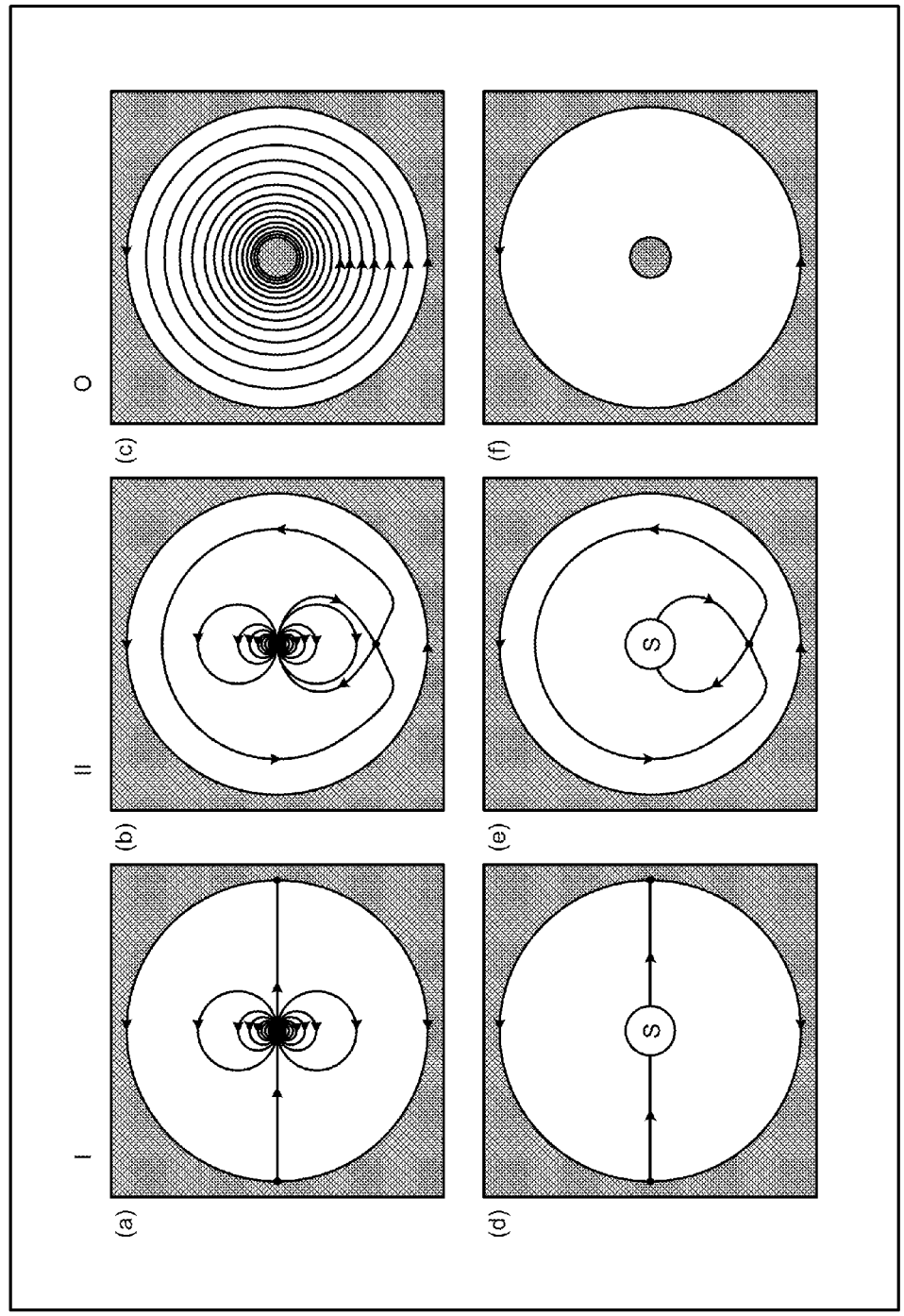
FIG. 4 is a diagram schematically showing three types of structurally stable flow patterns serving as initial structures.

FIG. 4 is a diagram schematically showing the three types of structurally stable flow patterns that serve as initial structures.

In other words, as shown in FIGS. 4(a) and 4(b), there are two types, Pattern I and Pattern II, of structurally stable flows in a simply connected exterior domain $D_\xi$ (0) with a hole. Each of these patters has a 1-source-sink, and it can be mathematically proved that there are only these two types. While, for a flow with a 1-source-sink for which a uniform flow is supposed, a doubly connected exterior domain $D_\xi$ (1) is constructed essentially from them, a flow without the 1-source-sink cannot be constructed from them, and an initial flow necessary to construct a flow corresponds to the pattern O schematically shown in FIG. 4(c). In order to simply represent the topological structures, the 1-source-sink is denoted by a circled S in the drawings, ss-orbits and closed orbits are not represented because there are an infinite number of them, and simple representations will be used below as shown in FIGS. 4(d) and 4(e). As shown in FIG. 4(c), all the structurally stable flow pattern, i.e., the closed orbits, in the doubly connected exterior domain $D_\xi$ (1) are not drawn and a simply illustration will be used as shown in FIG. 4(f).

Descriptions of Operational Word

An "operation" of adding a hole and the flow structure involved to inductively construct a structurally stable flow will be described with reference to FIGS. 5 and 6. In other words, an operation of adding one hole to the flow in a multiply connected exterior domain $D_\xi$ (M−1) with M holes to calculate a flow in a multiply connected exterior domain $D_\xi$ (M) will be described.

At the above-described step SA-2, five operations that can be adopted topologically are:
1) an $A_0$ operation of replacing an ss-orbit with a saddle point, a homoclinic saddle connection connecting to the saddle point and enclosing a hole, and two ss-saddle connections;
2) an $A_2$ operation of replacing an ss-orbit with two ss-∂-saddle connections and two ∂-saddles at a boundary newly added;
3) a $B_0$ operation of replacing a closed orbit with two homoclinic orbits forming a figure eight with addition of a hole and a saddle point;
4) a $B_2$ operation of replacing a closed orbit with an orbit with a ∂-saddle connection connecting two ∂-saddles added at a boundary of a hole newly added; and
5) a C operation of newly adding two ∂-saddles at a boundary already with 2k (k>0) ∂-saddles and connecting the two ∂-saddles with a ∂-saddle connection to enclose a hole newly added.

Figure 5:
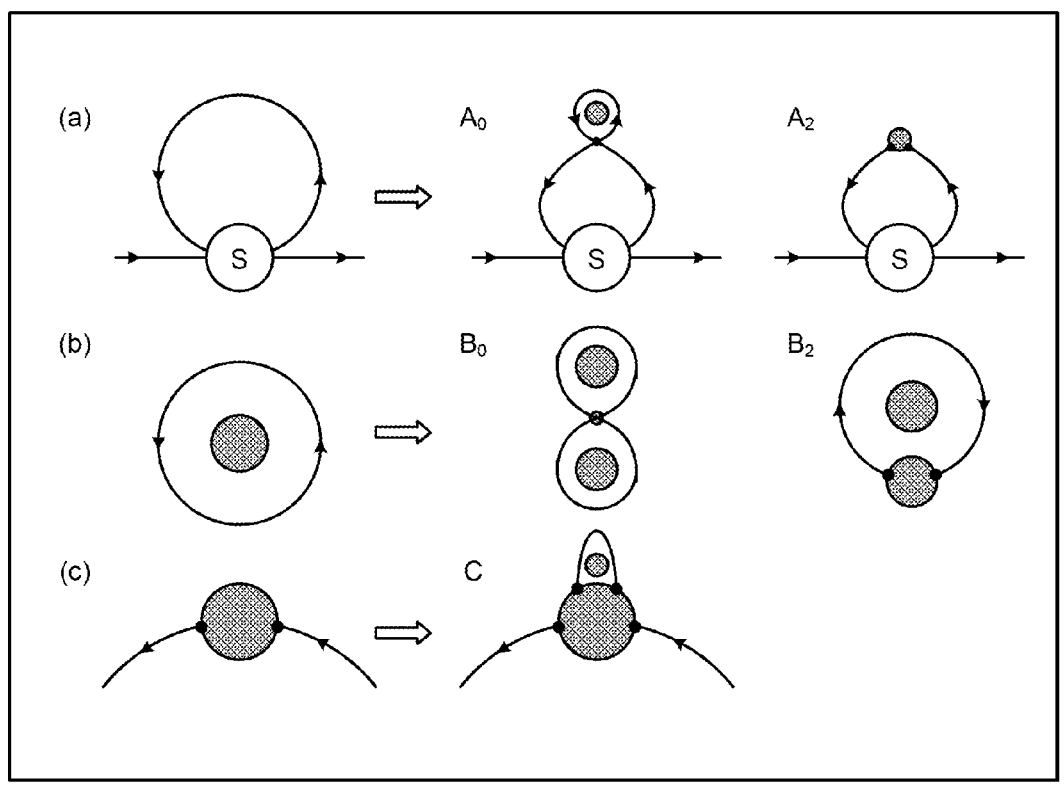
FIG. 5 is a diagram schematically showing five types of operations to construct a structurally stable flow by adding a hole.

FIG. 5 is a diagram schematically showing five types of operations of constructing a structurally stable flow by adding a hole.

As shown in FIG. 5(a), the operations $A_0$ and $A_2$ are applied to an ss-orbit. Furthermore, as shown in FIG. 5(b), the operations $B_0$ and $B_2$ are applied to a closed orbit. Furthermore, as shown in FIG. 5(c), the operation C is applied to a boundary already with ∂-saddles. It can be mathematically proved that there are only five types of operations to make it possible while maintaining structural stability (See Theorem 3.1, Corollary 3.1, Theorem 3.2).
Expression 2
Theorem 3.1. (Theorem 2.3.8. p. 74 [11]). Suppose that V is a $C^r$-Hamiltonian vector field on a compact orientable surface. V is structurally stable in H$^r$, if and only if V is regular and all (∂-)saddle connections are self-connected.
Expression 3
Corollary 3.1. Suppose, that the Hamiltonian vector field V is structurally stable in H$^r$. Then V can be represented by a sequence of the operations starting from the initial pattern O. Proof. By Theorem 3.1, the saddle connection diagram consists of homoclinic saddle connections and ∂-saddle connections that connect two ∂-saddles at the same boundary. Recall that the Euler number of $D_\xi$(M) is 1−M. Since V is regular, we can suppose that there are $k_1$ saddles and $k_2$ ∂-saddles. By Poincaré-Hopf theorem, these numbers satisfy $M-1=k_1+k_2/2$.

We will show the assertion by induction on M. Suppose that M=1. Then $k_3=k_2=0$ and so there are no saddles and ∂-saddles. Hence V is regular and we have O. Suppose that M≥1. We say that a connected component in the saddle connection diagram is inner most, if it bounds no other saddles and ∂-saddles. If an inner most component in the saddle connection diagram of V in $D_\xi$(M) is a homoclinic saddle connection (resp. a ∂-saddle connection with two ∂-saddles, then V is obtained by the operation $B_0$ (resp. $B_2$) from a structurally stable Hamiltonian vector field $\bar{V}$ on $D_\zeta(M-1)$. By inductive hypothesis, suppose that $\bar{V}$ is represented by $OO_1 \ldots O_{M-2}$, then V has a word representation $OO_1 \ldots O_{M-2}B_0$ (resp. $OO_1 \ldots O_{M-2}B_2$). Otherwise all inner most components are ∂-saddle connections with more than two ∂-saddles. Then V is obtained by the operation C from a structurally stable Hamiltonian vector field $\bar{V}$ on $D_\zeta(M-1)$. Hence, V has a word representation $OO_1 \ldots O_{M-2}C$.

Expression 4

Theorem 3.2. The Hamiltonian vector field $V \in x_1^r$ is structurally stable, if an only if
 (1) the restriction of V on the complement of the 1-source-sink point is regular,
 (2) all saddle connections are homoclinic connections,
 (3) all ∂-saddle connections connect two ∂-saddles located at the same boundary.

Proof. Obviously the regularity is necessary. Therefore we may assume that the restriction of V on the complement of the 1-source-sink point p is regular. Now suppose that there is a heteroclinic saddle connection between two distinct saddles p and q. Then H(p)=H(q) is satisfied where H represents the Hamiltonian for $V \in x_1^r$. We will show that the energy equality does not hold when we perturb the vector field. In order to accomplish it, we introduce a Hamiltonian vector field as follows. Let b:[0,1]→[0,1] be a smooth non-increasing function such that b(r)=1 for r∈[0,⅓], b(r)=0 for r∈[⅔,1], $b^1(r)<0$ for r∈(⅓, ⅔), with which we define an axisymmetric function ƒ:U−[0,1] by ƒ(r,θ):=b(r) in the polar coordinates (r,θ) of the unit disc U. Let $V_f$ be a Hamiltonian vector field on U defined from ƒ. Then a contour line of ƒ(r,θ) for any r∈(⅓, ⅔) is a closed orbit. For arbitrary ε>0, we define a function $\bar{H}$ on D<(M) by $\bar{H}:=H=\epsilon f$ on the open unit disk U around p and $\tilde{H}:=H$ otherwise. Then $\bar{H}$ is a smooth function and so define the Hamiltonian vector field $\tilde{V}$. Since $\tilde{H}(p)-\tilde{H}(q)=H(p)+\epsilon f(p)-H(q)=\epsilon \neq 0$, there is no orbits connecting p and q. Hence V is not structurally stable.

If there is a ∂-saddle connection between two ∂-saddles p and q at different boundaries with the same energy level H(p)=H(q). Then we can show the vector field V is not structurally stable as follows. Considering an annulus [0,1]× $S^1$ in $(0,\infty) \times S^2$ around the circular boundary with p, we can define the perturbed Hamiltonian vector field $\bar{H}$ obtained from H by perturbing it in the annulus with using the function b(r), for which the energy equality no longer holds.

Conversely, suppose that (1), (2) and (3) hold. By Proposition 2.1, V is locally structurally stable at the 1-source-sink point. Let $\bar{V}$ by a small perturbed vector field of V. Then we may assume that there is a small neighborhood U of the 1-source-sink point on which V and its small perturbation are identical. Hence it suffices to show that any small perturbation $\tilde{V}$ of $V|_{D_\zeta(M) \setminus U}$ which fixed ∂U is topological equivalence to $V|_{D_\zeta(M) \setminus U}$. Since the streamlines in the neighborhood of the 1-source-sink point can be obtained from the streamlines around two centers by identifying the centers, we can replace $V|_U$ with some vector field on U with two centers. Then all ss-(∂-saddle) connections are replaced by (∂-)saddle connections. By Theorem 3.1, the resulting vector field of V are structurally stable. Hence $\tilde{V}$ is topological equivalent to $V|_{D_\zeta(M) \setminus U}$.

The number of holes is increased one by one by performing these operations from the three types of flow patterns I, II and O of the initial structure assigned at step SA-1 (M to M+1) so that the flow in the domain with many holes is inductively constructed, and thus, in the embodiment, by regarding the sequence of operation words representing the operations as a sequence of words and listing them, a word representation of the flow field can be obtained. FIG. 6 is a diagram showing all classification of flow patterns with two structures and a uniform flow. As shown in FIG. 6, by applying operation words to the initial structural Patterns I and II in simply connected exterior domains $D_\zeta(0)$, all flow patterns in a doubly connected exterior domain $\bar{D}_\zeta(1)$ can be illustrated. Note that the total number of types of the flow patterns shown in FIG. 6 is not ten, i.e, two types (I and II)×five types ($A_0$, $A_2$, $B_0$, $B_2$ and C). In other words, the operation words are not obtained by arbitrarily arranging the five types of operation words and there are various limitations for mathematical reasons.

The limitations can be described as follows. Because the operations $A_0$ and $A_2$ are applied to an ss-orbit as described with FIG. 5, the existence of an ss-orbit is essential on the premise of applying the operations. Furthermore, because the operations $B_0$ and $B_2$ are applied to a closed orbit, the existence of a closed orbit is essential on the premise of applying the operations. Furthermore, because the operation C is applied to a boundary with ∂-saddles, the existence of a boundary with ∂-saddles is essential on the premise of applying the operation. For this reason, the rule of arrangement differs depending on from which of I, II and O the pattern words start. Descriptions will be given below for the rules of arranging the word sequences starting from the respective pattern words I, II and O, which are derived according to the above-described constraints.

There are the following rules to start with the pattern word O without a 1-source-sink. The necessary and sufficient conditions for the word representation starting with O are as follows:
 O-1) only $B_0$, $B_2$ and C are operations that can be practically applied, and accordingly the word representation starting with O is the list of these three words; and
 O-2) $B_2$ has to exist before C in order to include the word C in the word representation of the operation sequence.

Such a word sequence is referred to as a word of an O system (O-word) and the correctness of the rules can be mathematically proved (see Lemma 3.1).

Expression 5

Lemma 3.1 Let $OO_1 \ldots O_{M-1}$ be a sequence of operations, where $O_i \in \{B_0, B_2, C\}$. Then the followings are equivalent.
 1) Sequence is a word representation for a structurally stable Hamiltonian vector field in $D_\zeta(M)$.
 2) For any i with $O_i$=C, there is some j<i such that $O_j=B_2$.

For the word representation starting with the pattern word I, it is necessary to satisfy the following rules:
 I-1) all $A_0$, $A_2$, $B_0$, $B_2$ and C are operations that can be applied, and accordingly the word representation starting with I is the list of these five types of operation words; and
 I-2) C or $A_2$ has to exist before $B_0$ or $B_2$ in order to include the word of $B_0$ or $B_2$ in the word representation of the operation sequence.

Such a word sequence is referred to as a word of a I system (I-word) and the correctness of the rules can be mathematically proved (see Lemma 3.3).

Expression 6

Lemma 3.3. Let $IO_1 \ldots O_k$ be a sequence of operations, where $O_i \in \{A_0, A_2, B_0, B_2, C\}$ for i=1, ..., k. Then the followings are equivalent.
 1) The sequence is a word representation for a structurally stable Hamiltonian vector with the 1-source-sink point in $D_\zeta(M)$.
 2) For any i>1 with $O_i=B_0$ or $B_2$, there is some j<i such that $O_j=A_0$ or C.

Lastly, for the word representation starting with the pattern word II, it is necessary to satisfy the following rules:

II-1) $A_0$, $B_0$, $B_2$ and C are operations that can be applied and accordingly the word representation starting with II is the list of these four words; and II-2) $B_2$ has to exist before C in order to include the word C in the word representation of the operation sequence.

Such a word sequence is referred to as a word of a II system (II-word) and the correctness of the rules can be mathematically proved (see Lemma 3.4).

Expression 7

Lemma 3.4. Let $II\overline{O}_1 \ldots \overline{O}_k$ be a sequence of operations, where $\overline{O}_i \in \{A_0, B_0, B_2, C\}$ for i=1, . . . , k. Then the following are equivalent.

1) The sequence is a word representation for a structurally stable vector field with the 1-source-sink point in $D_\xi(M)$.
2) For any i>1 with $\tilde{O}_i \times C$, there is some j<i such that $\tilde{O}_j = B_2$.

An apparatus configuration and processing to implement the above-described method of the embodiment with a computer will be described in detail below. The above-descried method according to the embodiment may be implemented by a person or a computer and the following processing according to the embodiment may be used when implemented by a person.

Configuration of Word Representation Apparatus

Figure 7:
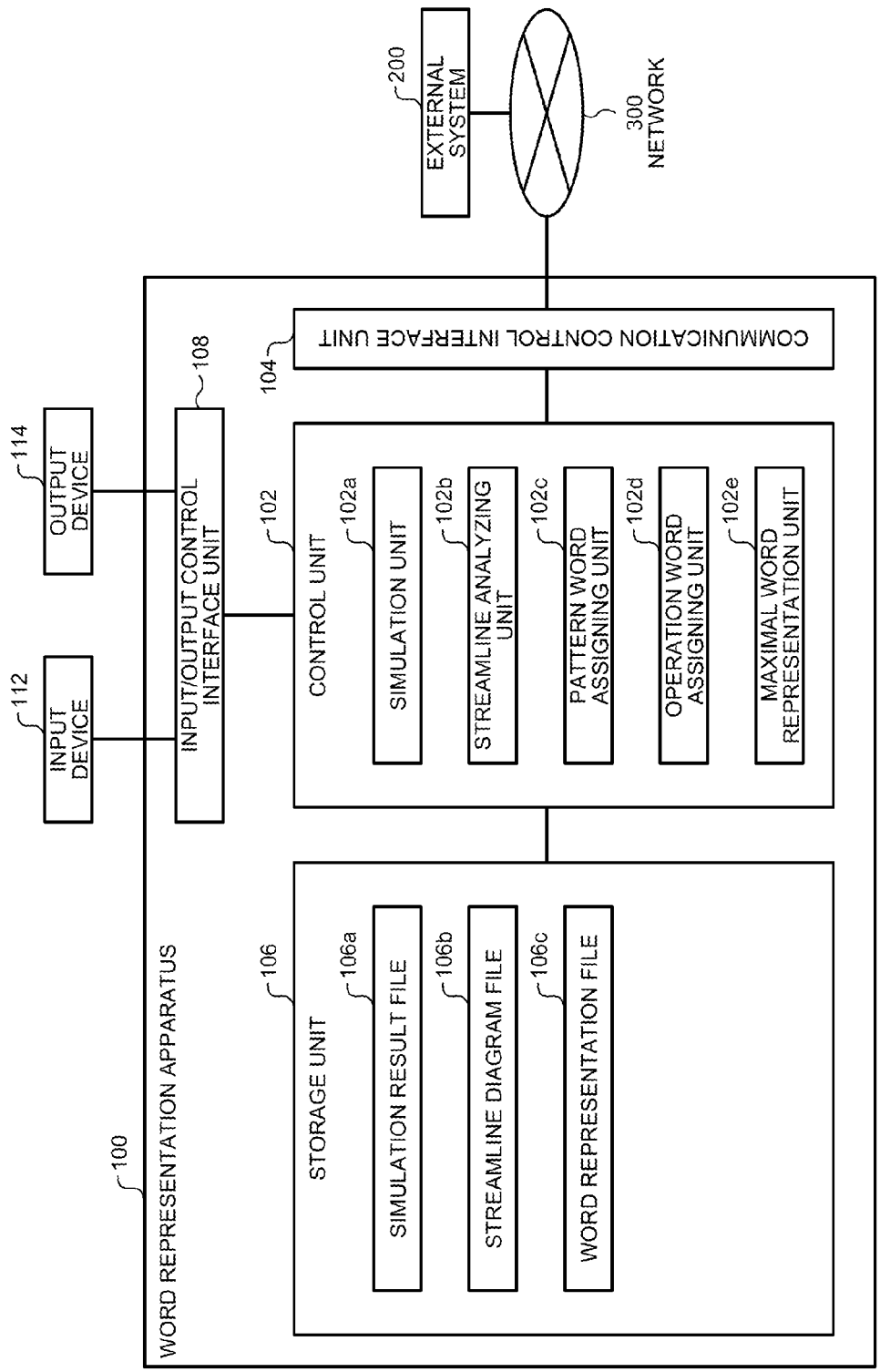
FIG. 7 is a block diagram showing an example of the present word representation apparatus 100 to which the embodiment is applied.

The configuration of the word representation apparatus according to the embodiment will be described with reference to FIG. 7. FIG. 7 is a block diagram showing an example of the present word representation apparatus 100 to which the embodiment is applied, schematically showing only components relevant to the embodiments from among the components.

As shown in FIG. 7, schematically, the word representation apparatus 100 according to the embodiment at least includes a control unit 102 and a storage unit 106 and, in the embodiment, further includes an input/output control interface unit 108 and a communication control interface unit 104. The control unit 102 is a CPU that generally controls the whole word representation apparatus 100, or the like. The communication control interface unit 104 is an interface that is connected to a communication device (not shown), such as a router, that is connected to a communication line or the like, and the input/output control interface unit 108 is an interface that is connected to an input device 112 and an output device 114. The storage unit 106 is a device that stores various data bases and tables. The units of the word representation apparatus 100 are communicably connected via arbitrary communication paths. Furthermore, the word representation apparatus 100 is communicably connected to a network 300 via a communication device, such as a router, and a wired or wireless communication line, such as a dedicated line.

The various databases and tables (a simulation result file 106a, a streamline diagram file 106b, a word representation file 106c, etc.) stored in the storage unit 106 are storage units, such as fixed disk devices, etc. For example, the storage unit 106 stores various programs used for various types of processing, tables, files, databases, webpages, etc.

From among these components of the storage unit 106, the simulation result file 106a is a simulation result storage unit that stores data representing the simulation results of mathematical simulations performed by a simulation unit 102a. For example, the simulation result file 106a may be data representing the values of design variables representing the shape of a structure and hydrodynamic simulation results (the pressure or the direction of flow of the fluid at each set of space coordinates) for a given fluid (such as an ocean current or air current) with respect to the structure. The simulation result file 106a may store, as a simulation result, data that is input in advance via the input device 112 through a model measurement of, for example, a wind channel test in a test room.

The streamline diagram file 106b is a streamline data storage unit that stores data, such as a streamline diagram, representing streamlines. For example, the streamline data stored in the streamline diagram file 106b may be data representing the streamlines that are analyzed by a streamline analyzing unit 102b on the basis of the data representing the simulation result.

The word representation file 106c is a word representation storage unit that stores word representation data. For example, the word representation data stored in the word representation file 106c is a word sequence consisting of a combination of a pattern word and an operation word.

The following refers back to FIG. 7. The input/output control interface unit 108 controls the input device 112 and the output device 114. For the output device 114, in addition to a monitor (including a home TV set), a speaker may be used (the output device 114 may be referred to as a monitor in the following). For the input device 112, a keyboard, a mouse, a microphone, etc. may be used.

The control unit 102 in FIG. 7 includes an internal memory for storing a control program of, for example, an OS (Operating System), a program that defines various processing procedures, and necessary data. The control unit 102 performs information processing to perform various types of processing by these programs etc. The control unit 102 includes functionally and schematically includes a simulation unit 102a, the streamline analyzing unit 102b, a pattern word assigning unit 102c, an operation word assigning unit 102d, and a maximal word representation unit 102e.

The simulation unit 102a is a simulation unit that performs a simulation of a fluid with respect to a structure. In addition to simulations in a two-dimensional plane, the simulation unit 102a may perform simulations of a fluid in a three-dimensional space. The simulation unit 102a may perform optimization of the structure by using a known optimization method. For example, while repeatedly changing a design variable that determines the shape of a structure by simulated annealing, a genetic algorithm method, etc., the simulation unit 102a may perform a fluid simulation with respect to the structure to calculate an appropriate shape of the structure (e.g., a shape of bridge piers with less resistance to the water current). In the embodiment, the simulation unit 102a stores data representing the results of simulations in the simulation result file 106a. For example, the simulation unit 102a may store data representing value of the design variable representing the shape of the structure and the results of hydrodynamic simulations of a given fluid (such as an ocean current or air current) with respect to the structure (the pressure, the direction of flow, resistance, etc. of the fluid at each set of spatial coordinates).

The streamline analyzing unit 102b is a flow analyzing unit that performs a flow analysis. The streamline analyzing unit 102b may derive a streamline diagram by performing a streamline analysis on the result of a simulation performed by the simulation unit 102a. For example, the streamline analyzing unit 102b creates a streamline diagram by using a known method from a numerical simulation and test data stored in the simulation result file 106a. Specifically, the streamline analyzing unit 102b can create a streamline diagram by, after calculating all of a saddle point, a source-sink, etc. from the numerical simulation result, drawing all contour lines of a stream function having the same value as that of the stream function at that point and drawing all contour lines of a stream function having the equal value as that of a stream function at the boundary. In a case of the result of a three-dimensional simulation, the streamline analyzing unit 102b may perform a streamline analysis after conversion into two-dimensional data at a cross section of the structure. Any plane can be a cross section and, preferably, the streamline analyzing unit 102b may implement a conversion into two-dimensional data at a cross section along a direction, i.e., the direction in which the fluid flows (uniform flow). For example, for transportation, such as a train, a motor vehicle or an airplane, a cross section may be generated along the travel direction. Furthermore, using the technology described in Computational Homology (Non Patent Literature 1), the streamline analyzing unit 102b may extract a characteristic structure that satisfies the conditions from a flow field. In the embodiment, the streamline analyzing unit 102b stores the created streamline diagram data in the streamline diagram file 106b.

The pattern word assigning unit 102c is a pattern word assigning unit that assigns any one of words (e.g., pattern words I and II) that define two types of flow patterns that can be topologically applied in a simply connected exterior domain with a hole. The pattern word assigning unit 102c may add any one of words defining three types of flow patterns in total, i.e., the above-described patterns and, in addition, a pattern without a 1-source-sink in a doubly connected exterior domain with two holes (i.e., Pattern words I, II and O). More specifically, the three types of flow patterns are:

1) a pattern I with a 1-source-sink and two ss-∂-saddle connections,
2) a pattern II with a 1-source-sink, a saddle point, a homoclinic saddle connection connecting to the saddle point, and two ss-saddle connections, and
3) a pattern O without a 1-source-sink.

The pattern word assigning unit 102c may perform, according to an algorithm for calculating a word representation from a streamline diagram (referred to as an "algorithm B"), a I classification step of determining whether or not there is an ss-∂-saddle connection in the streamline diagram and assigning a word of the pattern I when there is an ss-∂-saddle connection; and a II/O classification step of determining whether or not there is an ss-saddle connection in the streamline diagram when there is no ss-∂-saddle connection at the I classification step, assigning a word of the pattern II when there is an ss-saddle connection, and assigning a word of the pattern O when there is no ss-saddle connection on the other hand. This allows the pattern word assigning unit 102c to properly determine the system (I system, II system or O system) to which the streamline diagram belongs.

The operation word assigning unit 102d is an operation word assigning unit that forms a word representation corresponding to a multiply connected exterior domain with N holes by repeatedly assigning one of words (e.g., operation words $A_0$ $A_2$, $B_0$, $B_2$ and C) defining five types of operations that can be topologically applied in a case where one hole is added to the flow pattern. More specifically, the five types of operations are:

1) an $A_0$ operation of replacing an ss-orbit with a saddle point, a homoclinic saddle connection connecting to the saddle point and enclosing a hole, and two ss-saddle connections;
2) an $A_2$ operation of replacing an ss-orbit with two ss-∂-saddle connections and two ∂-saddles at a boundary newly added;
3) a $B_0$ operation of replacing a closed orbit with two homoclinic orbits forming a figure eight with addition of a hole and a saddle point;
4) a $B_2$ operation of replacing a closed orbit with an orbit with a ∂-saddle connection connecting two ∂-saddles added at a boundary of a hole newly added; and
5) a C operation of newly adding two ∂-saddles at a boundary already with 2k (k>0) ∂-saddles and connecting the two ∂-saddles with a ∂-saddle connection to enclose a hole newly added.

The operation word assigning unit 102d may assign operation words according to the following constraints. In other words, when assigning the five types of operation words, the operation word assigning unit 102d may 1) assign an operation word $A_0$ or $A_2$ on condition that there is one ss-orbit,
2) assign an operation word $B_0$ or $B_2$ on condition that there is a closed orbit, or
3) assign an operation word C on condition that there is a boundary with ∂-saddles.

The detailed descriptions of the specific processing performed by the operation word assigning unit 102d according to the constraints will be given below with reference to the flowchart. In the embodiment, the operation word assigning unit 102d stores, in the word representation file 106c, a word representation that is a word sequence of operation words that is assigned to the pattern word.

The maximal word representation unit 102e is a maximal word representation unit that converts a word representation that is formed by the pattern word assigning unit 102c and the operation word assigning unit 102d (a word sequence consisting of a combination of pattern word and operation word) into a maximal word. In other words, according to an algorithm for writing all flow patterns that can be applied (hereinafter, an "algorithm A"), while the group of word representations that are formed by the pattern word assigning unit 102c and the operation word assigning unit 102d writes all flow patterns, there are word representations defining the same flow pattern and word representations defining flow patterns in an inclusion relation. Thus, the maximal word representation unit 102e performs, on the word representation group, processing for excluding redundant word representations and inclusive word representations to obtain a maximal word representation. For example, the maximal word representation unit 102e forms a maximal word representation by exchanging the word representations according to the inclusion relation shown in the following table. In the following table, "=" denotes a matching relation, "≤" or "≥" denotes an inclusion relation. $B_2$ and C are the only exceptions. Because an inclusive relation is not satisfied by exchanging them, they are incomparable, which is symbolized by $B_2C\|CB_2$. The detailed descriptions of the specific processing performed by the maximal word representation unit 102e according to the relation expressions will be given below with reference to the flowcharts.

TABLE 1

|   | $A_0$ | $A_2$ | $B_0$ | $B_2$ | C |
|---|---|---|---|---|---|
| $A_0$ | = | = | ≤ | ≤ | = |
| $A_2$ |   | = | = | = | ≤ |
| $B_0$ |   |   | = | ≤ | ≥ |
| $B_2$ |   |   |   | = | ∥ |
| C |   |   |   |   | = |

This is the example of the configuration of the word representation apparatus 100 according to the embodiment. The word representation apparatus 100 may be connected to an external system 200 via the network 300. In this case, the communication control interface unit 104 implements communication control between the word representation apparatus 100 and the network 300 (or a communication device such as a router). In other words, the communication control interface unit 104 has a function of communicating data with another terminal via a communication line. Furthermore, the network 300 has a function of connecting the word representation apparatus 100 and the external system 200 each other and is, for example, the Internet or the like.

The external system 200 is connected to the word representation apparatus 100 via the network 300 and has a function of providing an external database relating to various types of data including simulation result data and streamline diagram data, a program for causing a connected information processing apparatus to implement the word representation method, etc.

The external system 200 may be configured as a web server, an ASP server, or the like. The hardware configuration of the external system 200 may be configured using an information processing apparatus, such as a generally available work station or a personal computer, and an auxiliary device thereof. Each of the functions of the external system 200 may be implemented by the CPU, disk device, memory device, input device, output device, and communication control device in the hardware configuration of the external system 200 and by a program for controlling them.

This is the end of descriptions of the configuration of the embodiment.

Processing Performed by Word Representation Apparatus 100

An example of the processing performed by the word representation apparatus 100 according to the embodiment configured as described above will be described in detail below with reference to the drawings.

Basic Processing

First, an example of basic processing that is performed by the word representation apparatus 100 will be described with reference to FIG. 1 described above again. The following basic processing is basic processing according to both an algorithm A for writing all flow patterns that can be applied and an algorithm B for calculating a word representation from a streamline diagram. In the following example, a pattern word is assigned first (step SA-1) and an operation word is then assigned (step SA-2); however, it is not limited to this, i.e., an operation word may be assigned first and a pattern word may be then assigned.

As shown in FIG. 1, the pattern word assigning unit 102c assigns any one of the pattern words I and II (step SA-1). The pattern word assigning unit 102c may assign any one of three types of pattern words I, II and O in total, i.e., the above described patterns and, in addition, the pattern O. More specifically, the above-described three types of pattern words are:

1) a pattern word I defining a pattern with a 1-source-sink and two ss-∂-saddle connections,
2) a pattern word II defining a pattern with a 1-source-sink, a saddle point, a homoclinic saddle connection connecting to the saddle point, and two ss-saddle connections, and
3) a pattern word 0 defining a pattern without a 1-source-sink.

The operation word assigning unit 102d assigns any one of the five types of operation words $A_0$, $A_2$, $B_0$, $B_2$ and C to the pattern word that is assigned by the pattern word assigning unit 102c (step SA-2). More specifically, the five types of operation words are as follows:

1) an operation word $A_0$ defining an operation of replacing an ss-orbit with a saddle point, a homoclinic saddle connection connecting to the saddle point and enclosing a hole, and two ss-saddle connections;
2) an operation word $A_2$ defining an operation of replacing an ss-orbit with two ss-∂-saddle connections and two ∂-saddles at a boundary newly added;
3) an operation word $B_0$ defining an operation of replacing a closed orbit with two homoclinic orbits forming a figure eight with addition of a hole and a saddle point;
4) an operation word $B_2$ defining an operation of replacing a closed orbit with an orbit with a ∂-saddle connection connecting two ∂-saddles added at a boundary of a hole newly added; and
5) an operation word C defining an operation of newly adding two ∂-saddles at a boundary already with 2k (k>0) ∂-saddles and connecting the two ∂-saddles with a ∂-saddle connection to enclose a hole newly added.

Because the above-described operations define the operations to add a hole, according to the algorithm B for assigning operation words to the streamline diagram, inverse operations (inverse exchanging operations) of the above-described operations are performed on the streamline diagram.

Because the above-described operations are on the premise that there are an ss-orbit, a closed orbit, etc, the operation word assigning unit 102d may assign operation words according to the following constraints. In other words, when assigning the five types of operation words, the operation word assigning unit 102d may 1) assign an operation word $A_0$ or $A_2$ on condition that there is an ss-orbit,
2) assign an operation word $B_0$ or $B_2$ on condition that there is a closed orbit, or
3) assign an operation word C on condition that there is a boundary with ∂-saddles.

The operation word assigning unit 102d determines whether the number of holes reaches N (step SA-3). For example, the operation word assigning unit 102d determines whether or not (N−1) operation words have been assigned to the pattern word I or II in a simply connected exterior domain $D_\xi$ (0) with a hole until the number of holes reaches N. The operation word assigning unit 102d also determines whether or not (N−2) operation words have been assigned to the pattern word O in a doubly connected exterior domain $D_\xi$ (1) with two holes until the number of holes reaches N. While N is set for the number of holes in a multiply connected exterior domain to be calculated according to the algorithm A, no value is set for the number of holes according to the algorithm B. In the case of the algorithm B, the operation word assigning unit 102d may determine whether the number of holes has reached N depending on whether or not the streamline diagram has reached an initial pattern (I, II or O) by the exchanging operations according to the operation words on the streamline diagram.

When the number of holes has not reached N (NO at step SA-3), the operation word assigning unit 102d further assigns an operation word to the word sequence that has been created (step SA-2).

When the number of holes has reached N (YES at step SA-3), the operation word assigning unit 102d stores the word sequence that has been created as a word representation in the word representation file 106c and ends the processing.

This is the example of the basic processing performed by the word representation apparatus 100 according to the embodiment. By forming a word representation as described above, it can be used for a method of optimizing structure designing. For example, the word representation apparatus 100 stores, according to the algorithm A, a group of word representations defining all flow patterns that can be applied to a structure in the word representation file 106c and represents, according to the algorithm B, to which flow pattern the simulation result corresponds by a word representation. This allows, according to the matching between word representations, to know in which area of all flow patterns the simulation unit 102a has performed searching. Upon determining that the search range is limited to a part of the flow patterns according to matching/mismatching between word representations, the simulation unit 102a may perform processing to extend the search area in the optimization method.

For example, the simulation unit 102a may set, in simulated annealing, a higher global parameter T (temperature) to allow a significant change for a design variable to get out of a local minimum. In addition, for a different use, the user may set a desired pattern (e.g. a flow pattern allowing an enclosure in designing of an oil fence) from among all the flow patterns that are derived according to the algorithm A. In this case, the simulation unit 102a may make an adjustment such that the search area has a desired pattern, which is set, according to matching/mismatching with respect to the word representation defining the desired pattern. For example, as described above, the simulation unit 102a may set, in simulated annealing, a high global parameter T (temperature) to allow a significant change for a design variable when the search area does not match the desired pattern and, on the other hand, may set a low global parameter T (temperature) to require a small change for the design variable when the search area matches the desired pattern.

Algorithm B

On the basis of the above-described basic processing, detailed descriptions of the processing according to the algorithm B for calculating a word representation from a streamline diagram will be given below with reference to FIGS. 8 to 15.

B-1. Processing for Assigning Pattern Word

Figure 8:
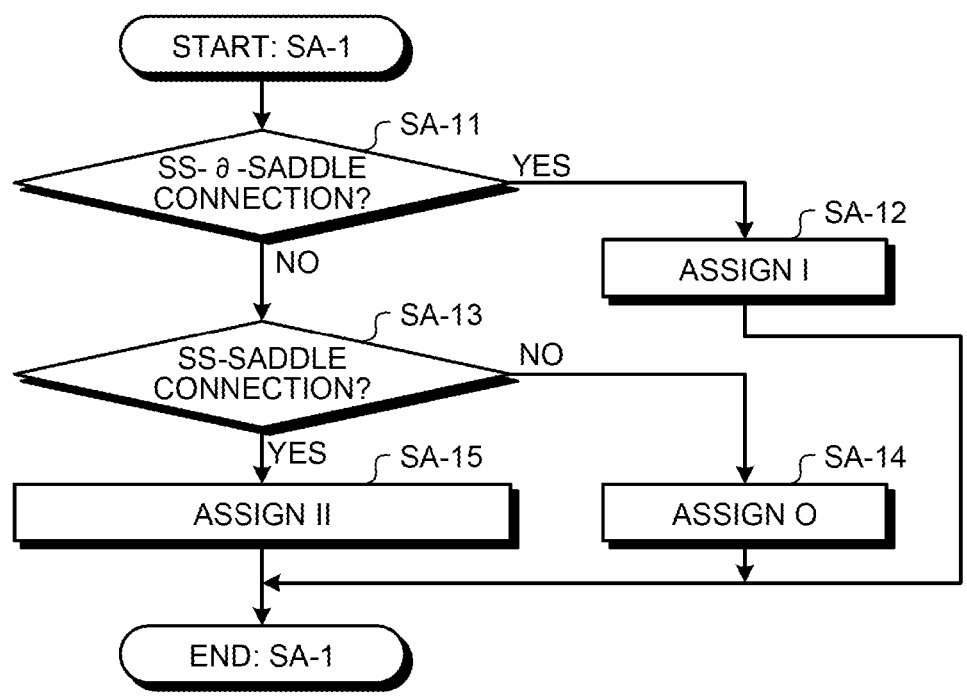
FIG. 8 is a flowchart showing an example of processing for assigning a pattern word.

Processing for assigning a pattern word at step SA-1 in the above-described basic processing will be described below with reference to FIG. 8. FIG. 8 is a flowchart showing an example of the processing for assigning a pattern word.

Figure 6:
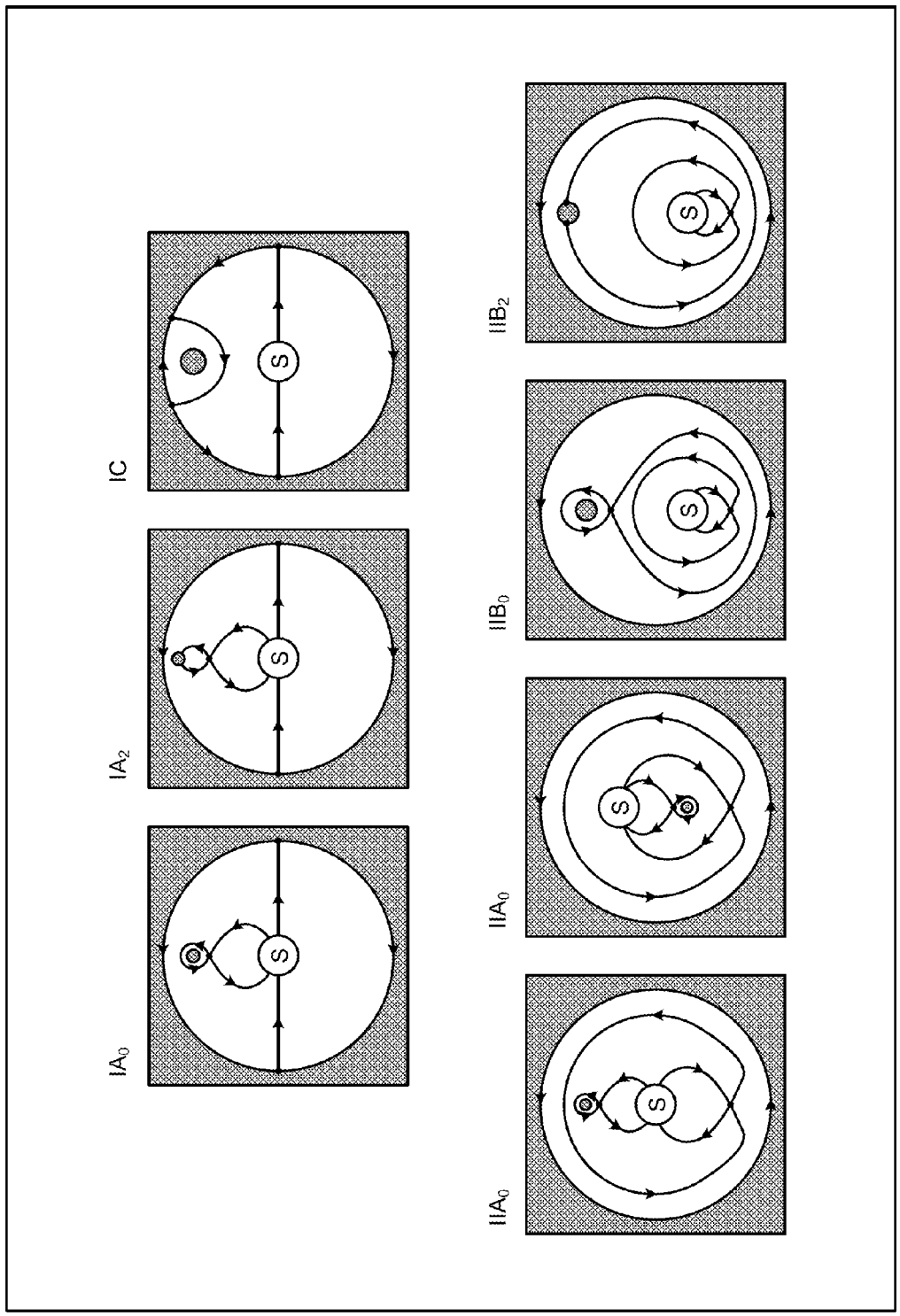
FIG. 6 is a diagram showing all classification of flow patterns with two structures and a uniform flow.

The streamline diagrams provided here are illustrated as domains in circles as shown in FIG. 6 for the purpose of illustration; however, this algorithm is an algorithm for determining the flow in an unbounded domain originally with a uniform flow. Because the flows obtained by numerical simulations or actual measurements are streamline diagrams of (obtained by taking out of) an unbounded flow field, what needs to be discussed is on whether a conversion into a domain in a circle is necessary. As a result of earnest investigation by the inventors, it was found that such conversion is unnecessary when the algorithm is applied. According to the fact, by performing the following processing on the provided streamline diagram, it is possible to known whether the streamline diagram is of the I system, II system or O system. In other words, when the following processing is performed, it is unnecessary to convert a streamline diagram into a domain in a circle by stereographic projection or the like.

As shown in FIG. 8, the pattern word assigning unit 102c determines whether or not there is an ss-∂-saddle connection in a provided streamline diagram according to the algorithm B for calculating a word representation from the streamline diagram (step SA-11).

When it is determined that there is an ss-∂-saddle connection (YES at step SA-11), the pattern word assigning unit 102c assigns a pattern word I (step SA-12), i.e., it is determined that the provided streamline diagram is of the I system.

On the other hand, when there is no ss-∂-saddle connection (NO at step SA-11), the pattern word assigning unit 102c determines whether there is an ss-saddle connection in the streamline diagram (step SA-13).

When it is determined that there is an ss-saddle connection (YES at step SA-13), the pattern word assigning unit 102c assigns a pattern word II (step SA-15), i.e., it is determined that the provided streamline diagram is of the II system.

On the other hand, when there is no ss-saddle connection (NO at step SA-13), the pattern word assigning unit 102c assigns a pattern word O (step SA-14), i.e., it is determined that the provided streamline diagram is of the O system.

This is the example of the processing for assigning a pattern word.

B-2. Processing for Assigning Operation Word of I System

Figure 9:
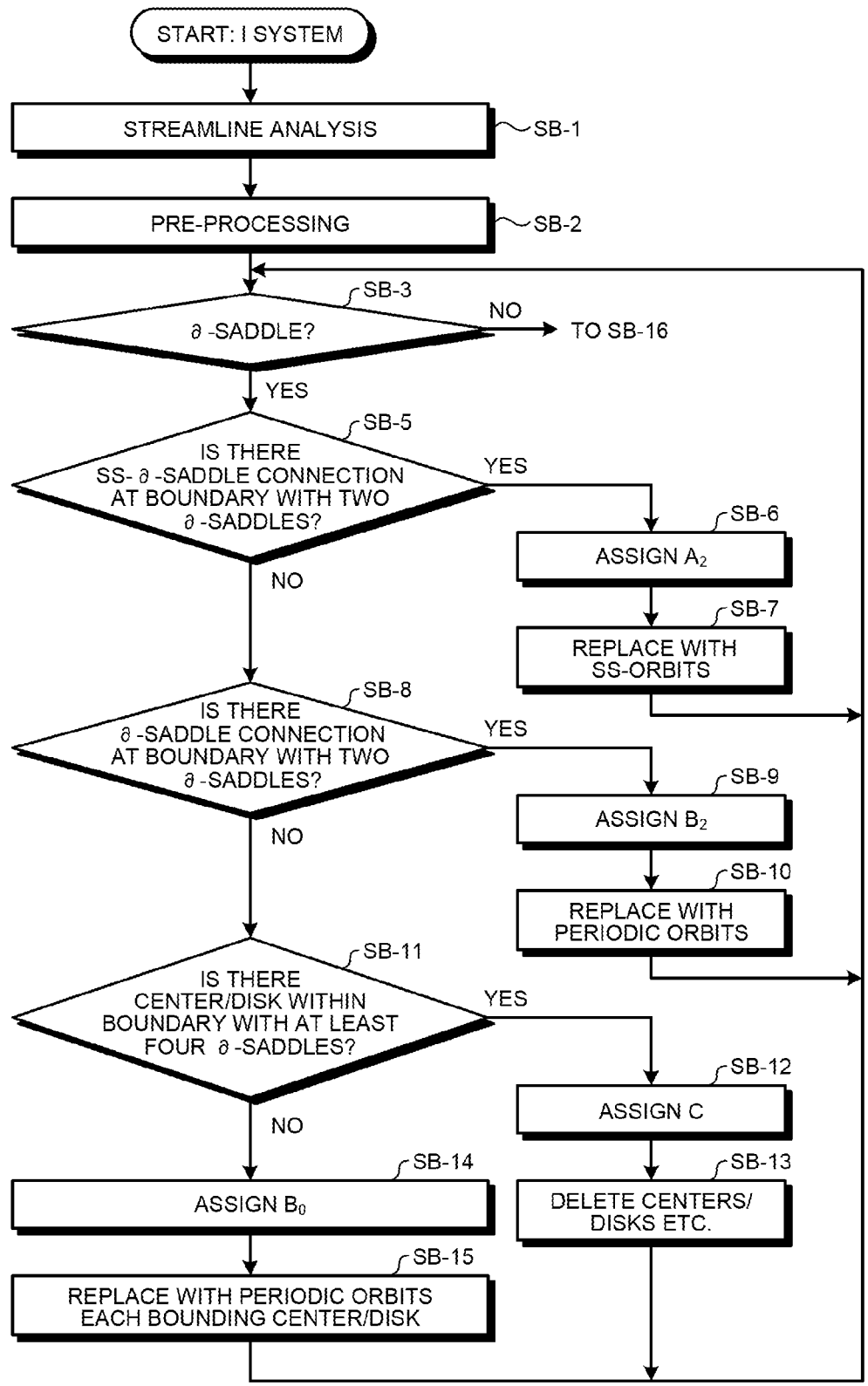
FIG. 9 is a flowchart showing an example of processing for assigning an operation word of a I system according to an algorithm B.
Figure 10:
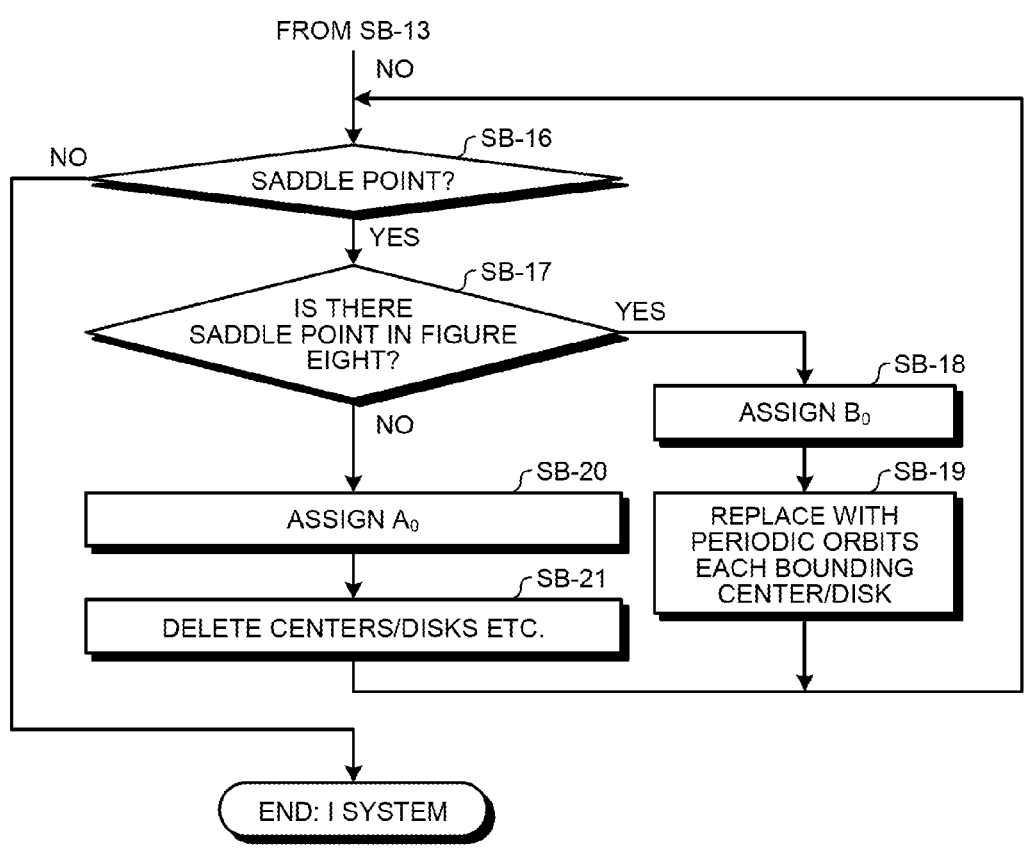
FIG. 10 is a flowchart showing the example of processing for assigning an operation word of the I system according to the algorithm B.

Next, an example of processing for assigning an operation word of an I system according to the algorithm B will be described with reference to FIGS. 9 and 10. FIGS. 9 and 10 are flowcharts showing an example of the processing for assigning an operation word of the I system according to the algorithm B.

As shown in FIG. 9, the streamline analyzing unit 102b creates a streamline diagram from the numerical simulation and test data stored in the simulation result file 106a by performing a streamline analysis (step SB-1). Specifically, the streamline analyzing unit 102b can create a streamline diagram by, after calculating all of a saddle point, a source-sink, etc. from the numerical simulation result, drawing all contour lines of a stream function having the same value as that of the stream function at that point and drawing all contour lines of a stream function having the equal value as that of a stream function at the boundary. In addition, the streamline analyzing unit 102b may extract a characteristic structure that satisfies the conditions from the flow field by using the technology described in Computational Homology (Non Patent Literature 1). In the embodiment, the streamline analyzing unit 102b stores the created streamline diagram data in the streamline diagram file 106b. For the data management, the streamline analyzing unit 102b may deal with the streamline data by assigning numbers to the obtained all of the lines, saddle point, ss-orbits, ∂-saddles, boundary, and source-sink. Accordingly, determining a data structure with such inclusion relations and by ordering them makes it easy for the calculator to deal with the following pre-processing and the algorithm of each system.

The streamline analyzing unit 102b performs pre-processing on the streamline diagram (step SB-2). For example, the streamline analyzing unit 102b performs the following three sets of pre-processing on the provided streamline diagram. The number of times these operations are performed is referred to as the number of errors that serves as an index representing to what extent the streamlines can be represented by the word representation. For example, for a whirlpool, in addition to the motion of the fluid on a plane, the ocean current flows in the direction orthogonal to the plane. For this reason, by performing the following pre-processing for approximation to the flow on the plane to use the number of times the pre-processing is performed (the number of errors) as an index representing how much it deviates from the true one.

1. If a stable manifold, an unstable manifold or a limit set of (∂-) saddle contains a limit cycle to a sink and from a source, it is closed and the sink, source, and limit cycle are deleted.

2. The (attracting) domain of sink is replaced with the center/disk and homoclinic (∂-) saddle connection.

3. The (repelling) domain of source is replaced with the center/disk and homoclinic (∂-) saddle connection.

The operation word assigning unit 102d determines whether or not there is a ∂-saddle in the streamline diagram on which the pre-processing is performed by the streamline analyzing unit 102b (step SB-3).

When there is a ∂-saddle (YES at step SB-3), the operation word assigning unit 102d determines whether or not there is one with an ss-∂-saddle connection at a boundary at which there are just two ∂-saddles (step SB-5).

When there are k ones each with an ss-∂-saddle connection containing a boundary at which there are just two ∂-saddles (YES at step SB-5), the operation word assigning unit 102d assigns k operation words $A_2$ (step SB-6) and the streamline analyzing unit 102b performs, on the streamline diagram, an operation of deleting the two ∂-saddles and the boundary and providing a replacement with an ss-orbit for k times (step SB-7).

On the other hand, when there is no one with an ss-∂-saddle connection containing a boundary at which there are just two ∂-saddles (NO at step SB-5), the operation word assigning unit 102d determines whether there is one with a ∂-saddle connection at the same boundary as that where there are just two ∂-saddles (step SB-8).

When there are k ones each with a ∂-saddle connection containing a boundary at which there are just two ∂-saddles (YES at step SB-8), the operation word assigning unit 102d assigns k operation words $B_2$ (step SB-9) and the streamline analyzing unit 102b performs, on the streamline diagram, an operation of deleting the ∂-saddles, which are connected by the ∂-saddle connection at the same boundary, and the boundary and providing a replacement with a closed orbit for k times (step SB-10).

On the other hand, when there is no one with a ∂-saddle connection containing a boundary at which there are just two ∂-saddles (NO at step SB-8), the operation word assigning unit 102d determines whether there is one with a ∂-saddle connection that is at the same boundary as that with at least four ∂-saddles and that encloses a center/disk (step SB-11).

When there are k boundaries each with a ∂-saddle connection that is at a boundary containing at least four ∂-saddles and that encloses a center/disk (YES at step SB-11), the operation word assigning unit 102d assigns k operation words C (step SB-12) and the streamline analyzing unit 102b performs, on the streamline diagram, an operation of deleting the ∂-saddle connection at the same boundary, the two ∂-saddles connected by the ∂-saddle connection, and the center/disk bounded by them for k times (step SB-13).

On the other hand, when there is no boundary with a ∂-saddle connection that is at a boundary containing at least four ∂-saddles and that encloses a center/disk (NO at step SB-11), because there is an innermost figure eight (i.e., ∂-saddle connections, at least one of which encloses a center/disk), it is determined that there are k ones and the operation word assigning unit 102d assigns k operation words $B_0$ (step SB-14), and the streamline analyzing unit 102b performs, on the streamline diagram, an operation of deleting one saddle and one boundary from the innermost figure eight and providing a replacement with a closed orbit bounding the center/disk for k times (step SB-15). The "figure eight" refers to a structure of a flow consisting of a saddle point and two homoclinic connections each enclosing a center/disk (formed in a shape of eight).

After the above-described processing is performed, the processing is returned to step SB-3 and, when there is still a ∂-saddle (YES at step SB-3), the word representation apparatus 100 repeats the above-described processing.

On the other hand, there is no ∂-saddle (NO at step SB-3), as shown in FIG. 10, the operation word assigning unit 102d determines whether there is a saddle point (step SB-16).

When there is a saddle point (YES at step SB-16), the operation word assigning unit 102d determines whether or not there is a saddle point that is in a figure eight pattern (step SB-17).

When there are k saddle points each in a figure eight pattern (YES at step SB-17), the operation word assigning unit 102d assigns k operation words $B_0$ (step SB-18) and the streamline analyzing unit 102b performs, on the streamline diagram, an operation of providing a replacement of the innermost figure eight pattern with a closed orbit around a center/disk for k times (step SB-19).

On the other hand, when there is no saddle point that is in a figure eight pattern (NO at step SB-17), the operation word assigning unit 102d assigns an operation word $A_0$ (step SB-20) and the streamline analyzing unit 102b deletes the saddle point, the homoclinic connection connecting to the saddle point, and the center/disk bounded by them (step SB-21).

After the above-described processing is performed, the processing is returned to step SB-16 and, when there is still a saddle point (YES at step SB-16), the word representation apparatus 100 repeats the above-described processing.

On the other hand, if there is no saddle point anymore (NO at step SB-16), the word representation apparatus 100 ends the processing for assigning an operation word of the I system according to the algorithm B. Selecting one $A_2$ from the obtained word sequence, replacing $A_2$ with I, shifting I to the top of the word sequence, and re-ordering the remaining word sequence according to the rules can provide a conversion into a maximal word.

B-3. Processing for Assigning Operation Word of II System

Figure 11:
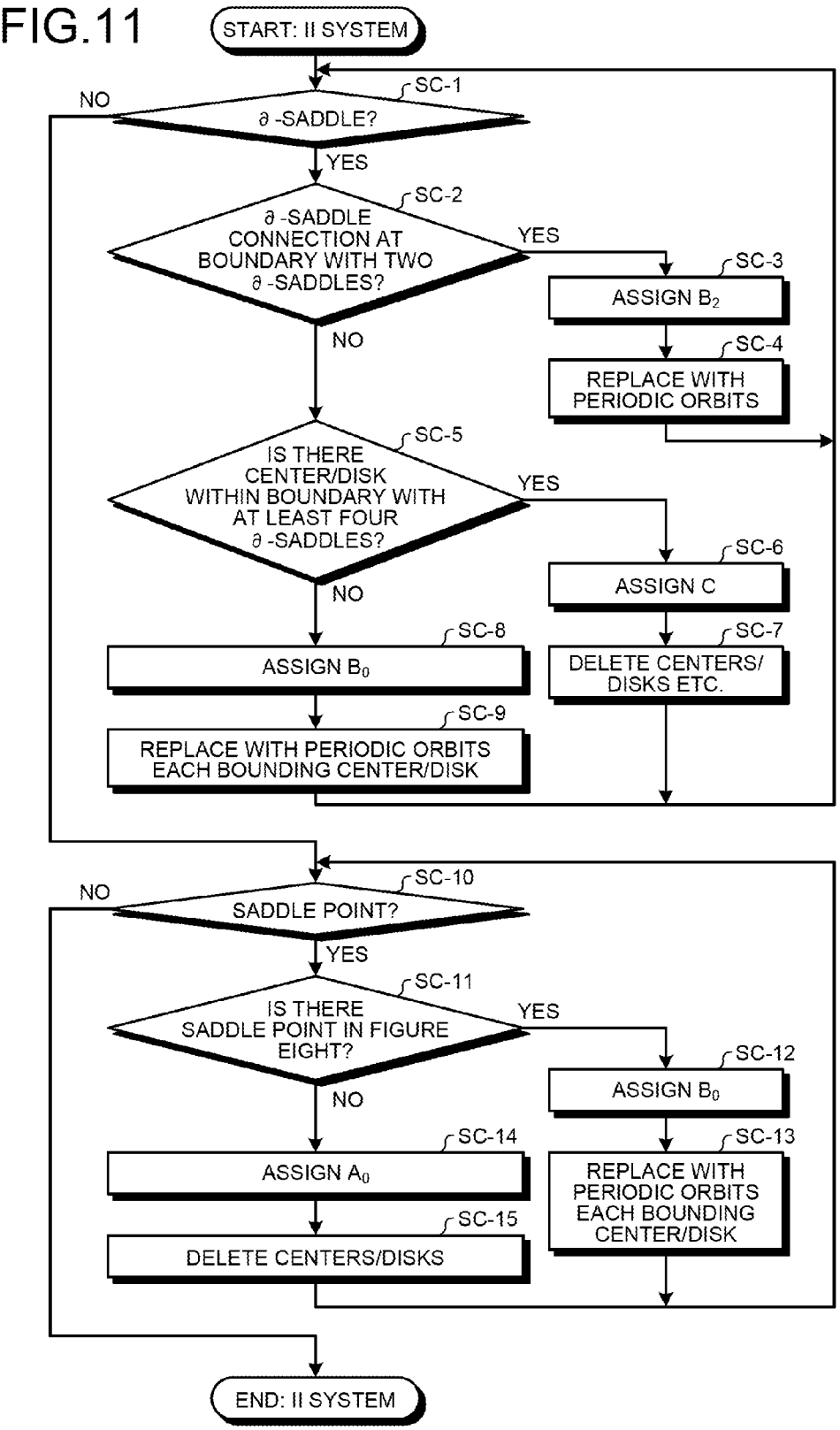
FIG. 11 is a flowchart showing an example of processing for assigning an operation word of a II system according to the algorithm B.

Next, an example of processing for assigning an operation word of the II system according to the algorithm B will be described with reference to FIG. 11. FIG. 11 is a flowchart showing the example of the processing for assigning an operation word of the II system according to the algorithm B. As in the case of step SB-1 and step SB-2 of the processing for assigning an operation word of the I system, generation of a streamline diagram and pre-processing may be performed by streamline analysis.

As shown in FIG. 11, the operation word assigning unit 102*d* determines whether or not there is a ∂-saddle on a provided streamline diagram (step SC-1).

When there is a ∂-saddle (YES at step SC-1), the operation word assigning unit 102*d* determines whether or not there is one with a ∂-saddle connection at a boundary at which there are just two ∂-saddles (step SC-2).

When there are k ones each with a ∂-saddle connection containing a boundary at which there are just two ∂-saddles (YES at step SC-2), the operation word assigning unit 102*d* assigns k operation words $B_2$ (step SC-3) and the streamline analyzing unit 102*b* performs, on the streamline diagram, an operation of replacing the ∂-saddles at the same boundary with a closed orbit for k times (step SC-4).

On the other hand, when there is no one with a ∂-saddle connection containing a boundary at which there are just two ∂-saddles (NO at step SC-2), the operation word assigning unit 102*d* determines whether there is one with a ∂-saddle connection that is at the same boundary as that with at least four ∂-saddles and that encloses a center/disk (step SC-5).

When there are k boundaries each with a ∂-saddle connection that is at a boundary containing at least four ∂-saddles and that encloses a center/disk (YES at step SC-5), the operation word assigning unit 102*d* assigns k operation words C (step SC-6) and the streamline analyzing unit 102*b* performs, on the streamline diagram, an operation of deleting the ∂-saddle connection at the same boundary, the two ∂-saddles connected by the ∂-saddle connection, and the center/disk bounded by them for k times (step SC-7).

On the other hand, when there is no boundary with a ∂-saddle connection that is at a boundary containing at least four ∂-saddles and that encloses a center/disk (NO at step SC-5), because there is an innermost figure eight, it is determined that there are k ones and the operation word assigning unit 102*d* assigns k operation words $B_0$ (step SC-8), and the streamline analyzing unit 102*b* performs, on the streamline diagram, an operation of replacing the innermost figure eight pattern with a closed orbit enclosing a center/disk for k times (step SC-9).

After the above-described processing is performed, the processing is returned to step SC-1 and, when there is still a ∂-saddle (YES at step SC-1), the word representation apparatus 100 repeats the above-described processing.

On the other hand, when there is no more ∂-saddle (NO at step SC-1), the operation word assigning unit 102*d* determines whether or not there is a saddle point (step SC-10).

When there is a saddle point (YES at step SC-10), the operation word assigning unit 102*d* determines whether or not there is a saddle point that is in a figure eight pattern (step SC-11).

When there are k saddle points each in a figure eight pattern (YES at step SC-11), the operation word assigning unit 102*d* assigns k operation word $B_0$ (step SC-12) and the streamline analyzing unit 102*b* performs, on the streamline diagram, an operation of providing a replacement of the innermost figure eight pattern with a closed orbit around a center/disk for k times (step SC-13).

On the other hand, when there is no saddle point that is in a figure eight pattern (NO at step SC-11), there are the saddle point, a homoclinic connection connecting to the saddle point, and a center/disk bounded by them and thus it is determined that there are k ones, and the operation word assigning unit 102*d* assigns k operation words $A_0$ (step SC-14) and the streamline analyzing unit 102*b* performs an operation of deleting the saddle point, the homoclinic connection connecting to the saddle point, and the center/disk bounded by them for k times (step SC-15).

After the above-described processing is performed, the processing is returned to step SC-10 and, when there is still a saddle point (YES at step SC-10), the word representation apparatus 100 repeats the above-described processing.

On the other hand, when there is no more ∂-saddle point (NO at step SC-10), the word representation apparatus 100 ends the processing for assigning an operation word of the II system according to the algorithm B. Selecting one $A_0$ from among the obtained word sequence, replacing $A_0$ with II, shifting II to the top of the word sequence, and re-ordering the remaining word sequence according to the rules can provide a conversion into a maximal word.

B-4. Processing for Assigning Operation Word of O System

Figure 12:
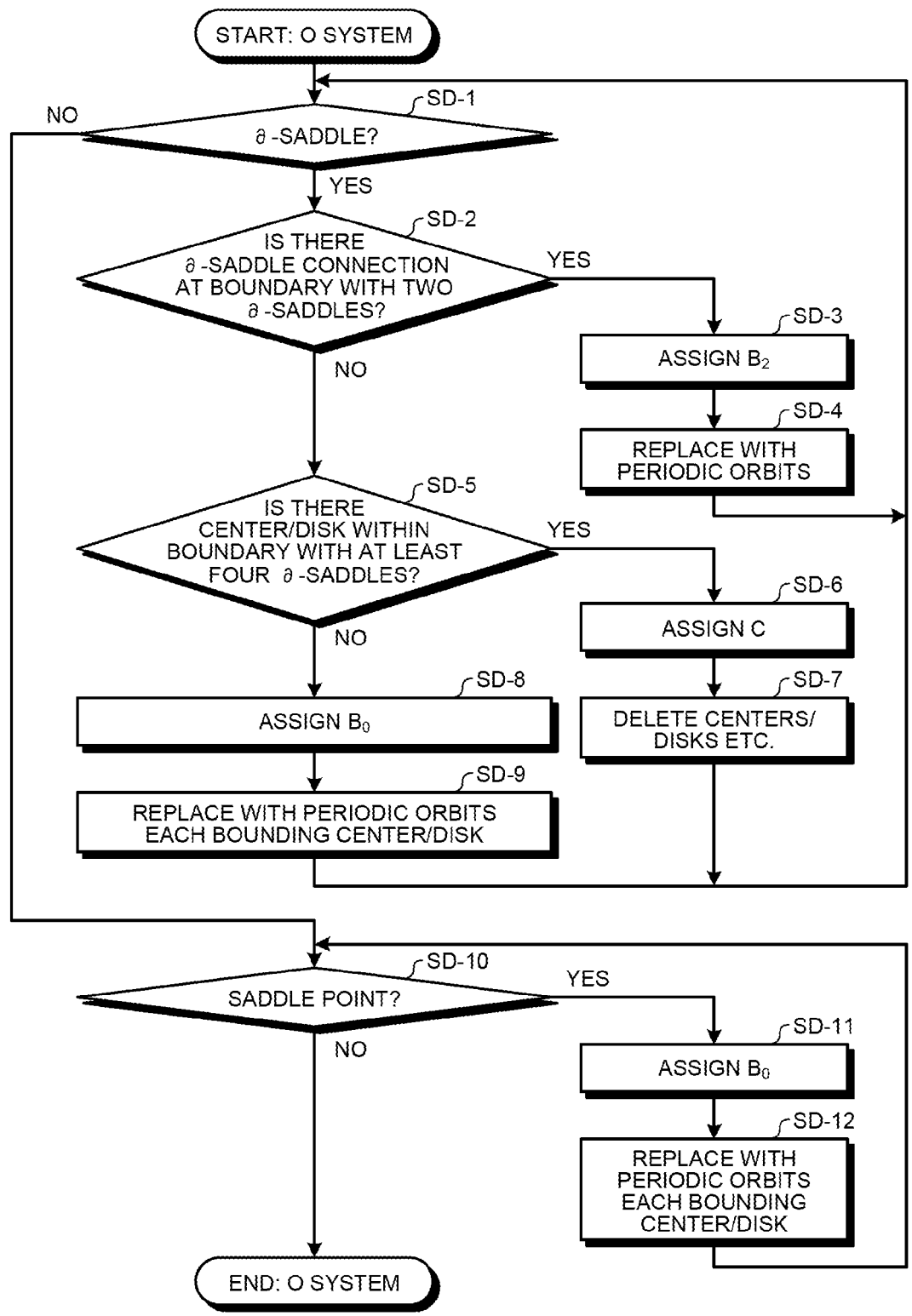
FIG. 12 is a flowchart showing an example of processing for assigning an operation word of an O system according to the algorithm B.

Next, an example of processing for assigning an operation word of the O system according to the algorithm B will be described below with reference to FIG. 12. FIG. 12 is a flowchart showing the example of the processing for assigning an operation word of the O system according to the algorithm B. As in the case of step SB-1 and step SB-2 of the processing for assigning an operation word of the I system, generation of a streamline diagram and pre-processing may be performed by streamline analysis.

As shown in FIG. 12, the operation word assigning unit 102*d* determines whether or not there is a ∂-saddle on a provided streamline diagram (step SD-1).

When there is a ∂-saddle (YES at step SD-1), the operation word assigning unit 102*d* determines whether or not there is one with a ∂-saddle connection at a boundary at which there are just two ∂-saddles (step SD-2).

When there are k ones each with a boundary at which there are just two ∂-saddles and with a ∂-saddle connection (YES at step SD-2), the operation word assigning unit 102*d* assigns k operation words $B_2$ (step SD-3) and the streamline analyzing unit 102*b* performs, on the streamline diagram, an operation of deleting the ∂-saddles, which are at the boundary and are connected by the ∂-saddle connection, and the boundary and providing a replacement with a closed orbit for k times (step SD-4).

On the other hand, when there is no one with a ∂-saddle connection containing a boundary at which there are just two ∂-saddles (NO at step SD-2), the operation word assigning unit 102*d* determines whether there is one with a ∂-saddle connection that is at the same boundary as that with at least four ∂-saddles and that encloses a center/disk (step SD-5).

When there are k boundaries each with a ∂-saddle connection that is at a boundary containing at least four ∂-saddles and that encloses a center/disk (YES at step SD-5), the operation word assigning unit 102*d* assigns k operation words C (step SD-6) and the streamline analyzing unit 102*b* performs, on the streamline diagram, an operation of deleting the ∂-saddle connection at the same boundary, the two ∂-saddles connected by the ∂-saddle connection, and the center/disk bounded by them for k times (step SD-7).

On the other hand, when there is no boundary with a ∂-saddle connection that is at a boundary containing at least four ∂-saddles and that encloses a center/disk (NO at step SD-5), because there is an innermost figure eight, it is determined that there are k ones and the operation word assigning unit 102*d* assigns k operation words $B_0$ (step SD-8), and the streamline analyzing unit 102*b* performs, on the streamline diagram, an operation of replacing the innermost figure eight pattern with a closed orbit enclosing a center/disk for k times (step SD-9).

After the above processing is performed, the processing is returned to step SC-1 and, when there is still a ∂-saddle (YES at step SD-1), the word representation apparatus 100 repeats the above-described processing.

On the other hand, when there is no more ∂-saddle (NO at step SD-1), the operation word assigning unit 102$d$ determines whether or not there is a saddle point (step SD-10).

When there are k saddle points (YES at step SD-10), the operation word assigning unit 102$d$ assigns k operation word $B_0$ (step SD-11) and the streamline analyzing unit 102$b$ performs, on the streamline diagram, an operation of replacing the innermost figure eight pattern with a closed orbit around a center/disk for k times (step SD-12).

After the above-described processing is performed, the processing is returned to step SD-10 and, when there is still a saddle point (YES at step SD-10), the word representation apparatus 100 repeats the above-described processing.

On the other hand, when there is no more ∂-saddle point (NO at step SD-10), the word representation apparatus 100 ends processing for assigning an operation word of the O system according to the algorithm B. Adding O to the top of the obtained word sequence and re-ordering it according to the rules can provide a conversion into a maximal word.

This is the detailed example of the processing according to the algorithm B for calculating a word representation. This allows an appropriate calculation of a word representation corresponding to an arbitrary streamline diagram. The above-described processing according to the algorithm B is an example only, and the present invention is not limited to the above-described algorithm. For example, the following processing may be performed as another example of the processing according to the algorithm B.

B-5. Processing for Assigning Operation word of I-II System (Algorithm for Subspecies)

Figure 13:
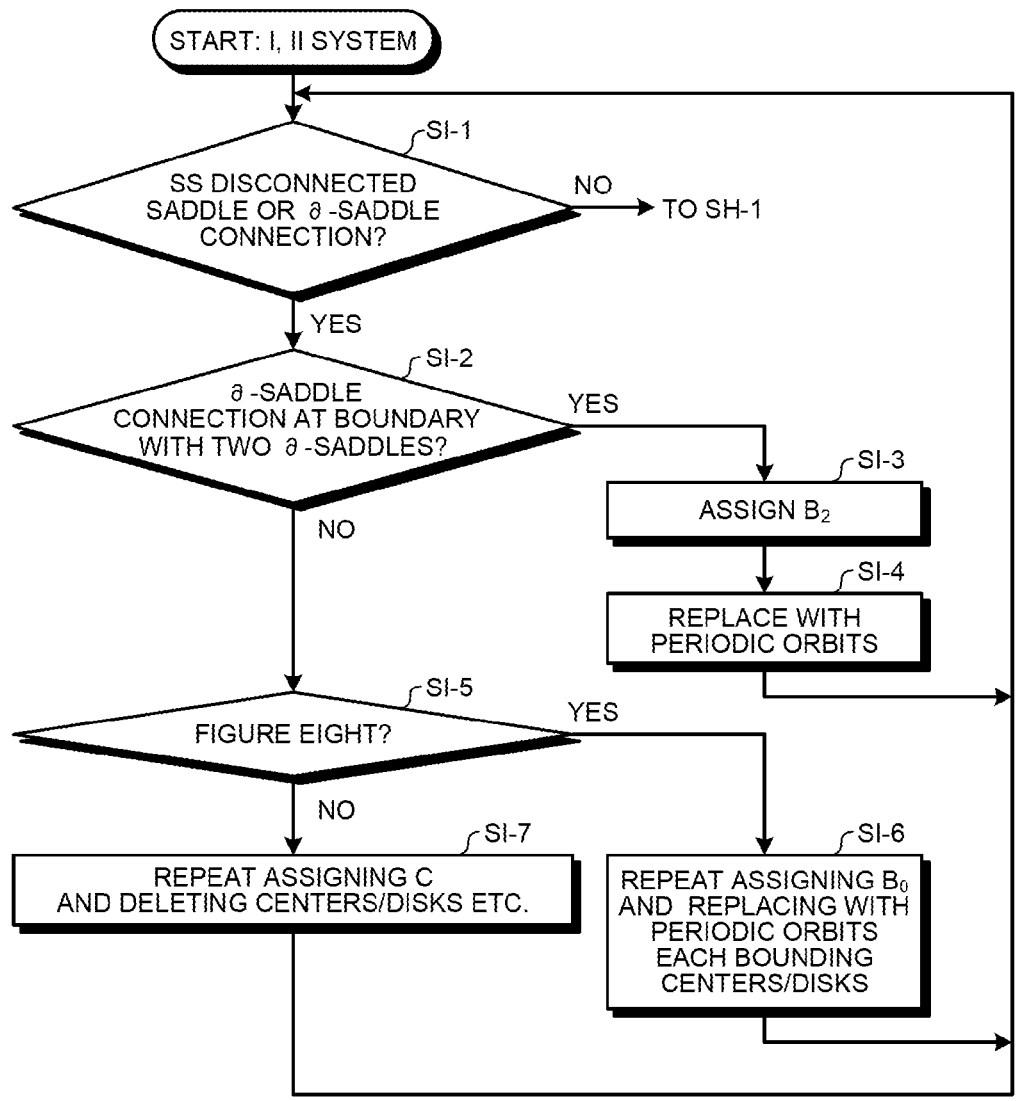
FIG. 13 is a flowchart showing another example of the processing for assigning an operation word of the I/II system according to the algorithm B (I/II-Word alg).
Figure 14:
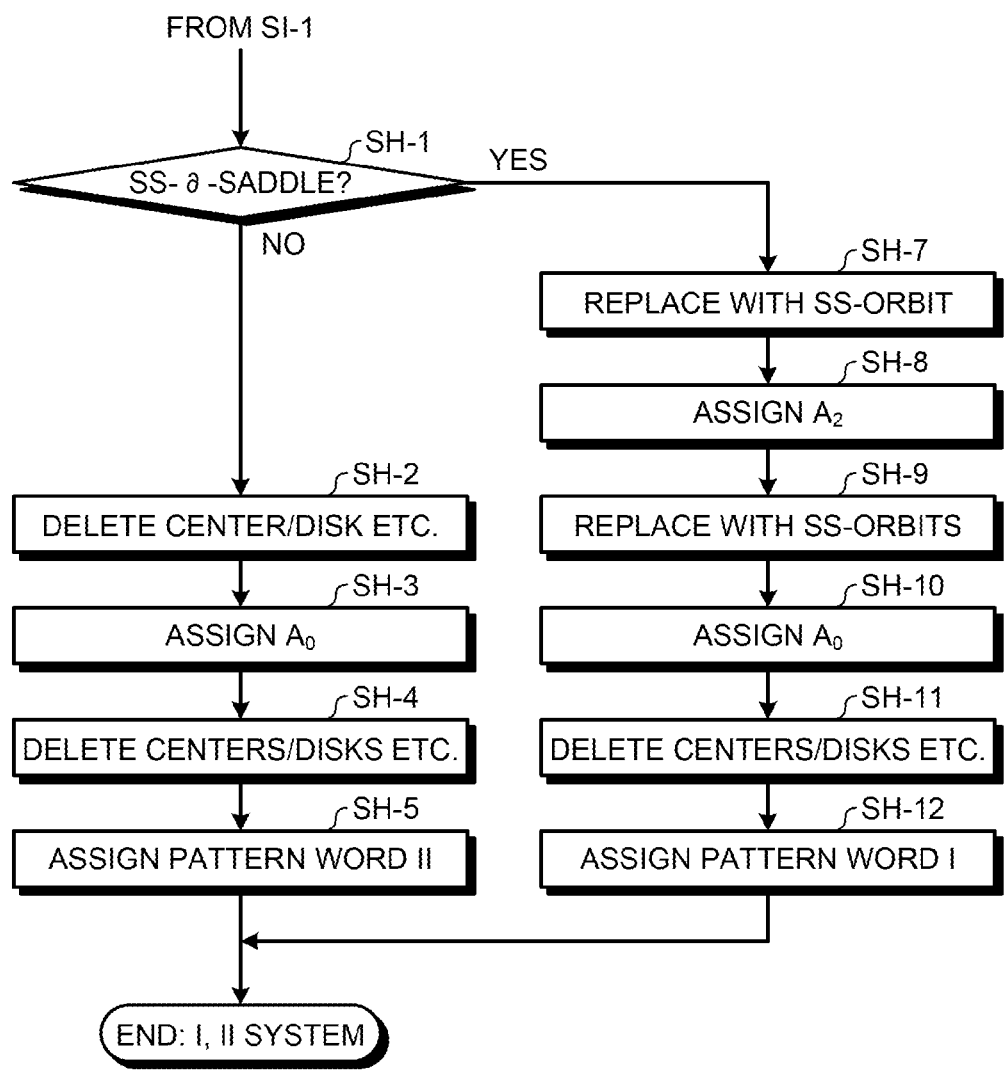
FIG. 14 is a flowchart showing another example of the processing for assigning an operation word of the I/II system according to the algorithm B (I/II-Word alg).

Next, an example of processing for assigning a word of the I-II system according to the algorithm B (algorithm for subspecies) will be described below with reference to FIGS. 13 and 14. FIGS. 13 and 14 are flowcharts showing the example of the processing for assigning a word of the I-II system according to the algorithm B (I-II-word alg). As in the case of step SB-1 and step SB-2 of the above-described processing, generation of a streamline diagram and pre-processing may be performed by streamline analysis. When an operation word is assigned in the following processing for assigning an operation word, it is assigned from the last to the first.

As shown in FIGS. 13 and 14, the operation word assigning unit 102$d$ determines, on a streamline diagram on which the pre-processing has been performed by the streamline analyzing unit 102$b$, whether or not there is a saddle point that is not connected to a source-sink or there is a ∂-saddle connection (step SI-1).

When there is a saddle point that is not connected to a source-sink or there is a ∂-saddle connection (YES at step SI-1), the operation word assigning unit 102$d$ determines whether or not there is one with a ∂-saddle connection at a boundary at which there are just two ∂-saddles (step SI-2).

When there are k ones each with a ∂-saddle connection at a boundary at which there are just two ∂-saddles (YES at step SI-2), the operation word assigning unit 102$d$ assigns k operation words $B_2$ (step SI-3) and the streamline analyzing unit 102$b$ performs, on the streamline diagram, an operation of deleting the ∂-saddles, which are at the same boundary and are connected by the ∂-saddle connection, and the boundary and providing a replacement with a closed orbit for k times (step SI-4).

When there is no one with a ∂-saddle connection at a boundary at which there are just two ∂-saddles (NO step SI-2) and there is an innermost figure eight pattern (YES at step SI-5), the operation word assigning unit 102$d$ assigns an operation word $B_0$ and the operation word assigning unit 102$d$ performs an operation of replacing the innermost figure eight pattern with a closed orbit around a center/disk (step SI-6). This operation (operation of assigning an operation word $B_0$ and providing a replacement with a closed orbit) is repeatedly performed as much as possible.

On the other hand, when there is no saddle point that is in an innermost figure eight pattern (NO at step SI-5), i.e., when there is a boundary with a ∂-saddle connection that is at a boundary containing at least four ∂-saddles and that encloses a center/disk, the operation word assigning unit 102$d$ assigns an operation word C and the streamline analyzing unit 102$b$ repeatedly performs an operation of deleting the ∂-saddle connection at the boundary, the two ∂-saddles connected by the ∂-saddle connection, and the center/disk bounded by them (step SI-7). This operation (operation of assigning an operation word C and deleting a center/disk) is repeatedly performed as much as possible.

After the above processing is performed, the processing is returned to step SI-1 and, when there is still a saddle that is not connected to a source-sink or there is a ∂-saddle connection (YES at step SI-1), the word representation apparatus 100 repeats the above-described processing.

On the other hand, when there is only a saddle that is connected to a source-sink and there is no more ∂-saddle connection (NO at step SI-1), as shown in FIG. 14, the operation word assigning unit 102$d$ determines whether or not there is an ss-∂-saddle (step SH-1).

When there is no ss-∂-saddle (NO at step SH-1), the streamline analyzing unit 102$b$ performs, once, an operation of deleting the saddle point, the homoclinic saddle connection connecting to the saddle point, and the center/disk bounded by them (step SH-2).

When there are k ss-saddles, the operation word assigning unit 102$d$ assigns k operation words $A_0$ (step SH-3).

The streamline analyzing unit 102$b$ performs an operation of deleting the saddle point, the homoclinic saddle connection connecting to the saddle point, and the center/disk bounded by them for k times (step SH-4).

The pattern word assigning unit 102$c$ assigns a pattern word II (step SH-5) and the word representation apparatus 100 ends the processing for assigning an operation word of the I-II system according to the algorithm (I-II-word alg). The obtained word sequence is a maximal word.

On the other hand, at step SHI, when there is an ss-∂-saddle (YES at step SH-1), the streamline analyzing unit 102$b$ performs, on the streamline diagram, an operation of deleting these two ∂-saddles and the boundary and implementing a replacement with an ss-orbit once (step SH-7).

When there are k ss-∂-saddles, the operation word assigning unit 102$d$ assigns k operation words $A_2$ (step SH-8).

The streamline analyzing unit 102$b$ then performs, on the streamline diagram, an operation of deleting these two ∂-saddles and the boundary and providing a replacement with an ss-orbit for k times (step SH-9).

When there are k ss-saddles, the operation word assigning unit 102$d$ assigns k operation words $A_0$ (step SH-10).

The streamline analyzing unit 102$b$ performs an operation of deleting the saddle point, the homoclinic saddle connection connecting to the saddle point, and the center/disk bounded by them for k times (step SH-11).

The pattern word assigning unit 102$c$ assigns a pattern word I (at step SH-12) and the word representation apparatus 100 ends the processing for assigning an operation word of the I-II system according to the algorithm B (I-II-word alg). The obtained word sequence is a maximal word.

B-6. Operation of Assigning Operation Word of O System (Algorithm for Subspecies)

Figure 15:
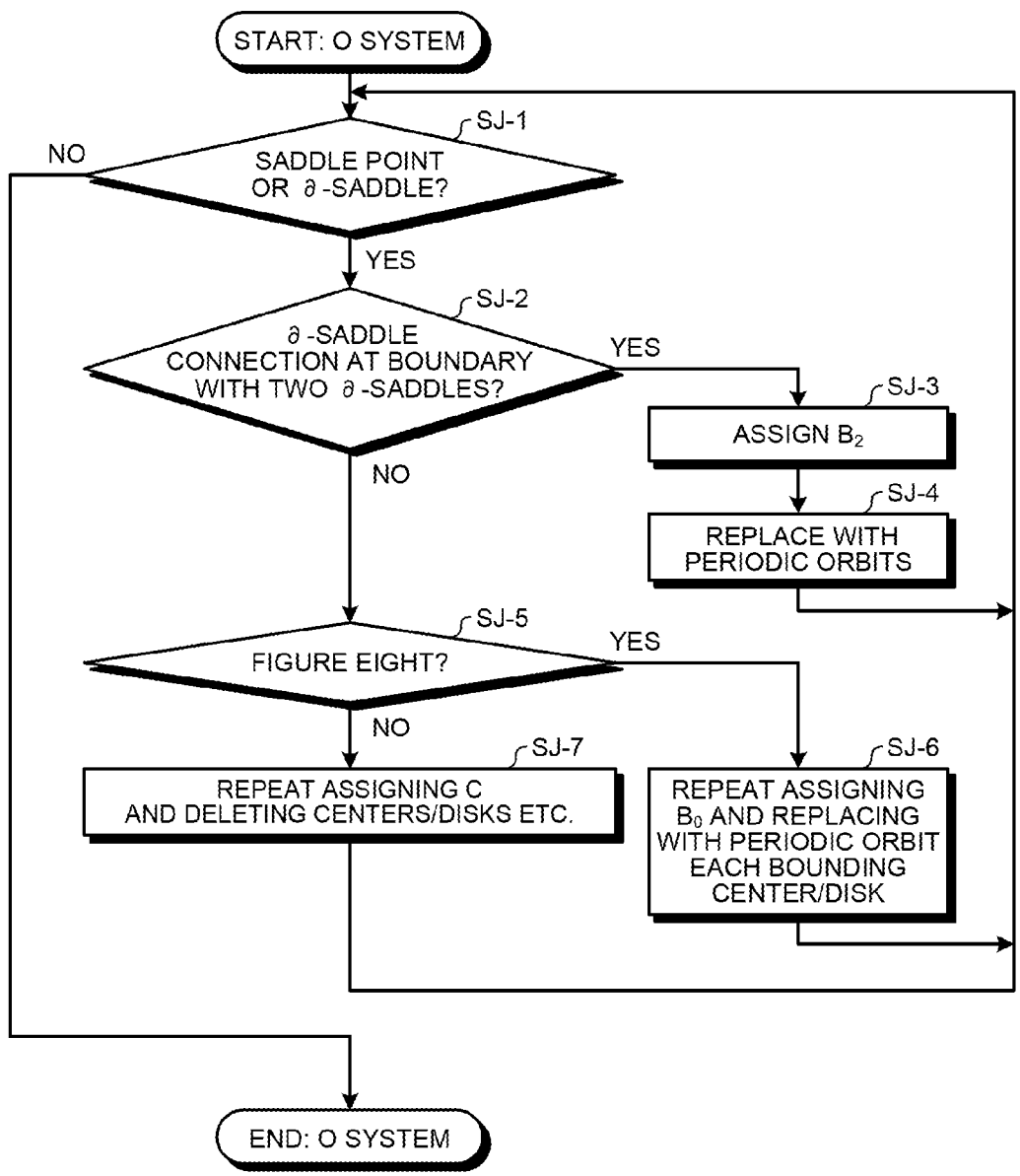
FIG. 15 is a flowchart showing another example of the processing for assigning an operation word of the O system according to the algorithm B (O-Word alg).

Next, an example of processing for assigning an operation word of the O system according to the algorithm B (algorithm for subspecies) will be described below with reference to FIG. 15. FIG. 15 is a flowchart showing another example of the processing for assigning an operation word of the O system according to the algorithm B (O-word alg). As in the case of step SB-1 and step SB-2 of the above-described assigning processing, generation of a streamline diagram and pre-processing may be performed by streamline analysis. When an operation word is assigned in the following processing for assigning an operation word, it is assigned from the last to the first.

As shown in FIG. 15, the operation word assigning unit 102d determines, on a provided streamline diagram, whether or not there is a saddle or a ∂-saddle (step SJ-1).

When there is a saddle or a ∂-saddle (YES at step SJ-1), the operation word assigning unit 102d determines whether or not there is one with a ∂-saddle connection at a boundary at which there are just two ∂-saddles (step SJ-2).

When there are k ones each with a ∂-saddle connection connecting to a boundary at which there are just two ∂-saddles (YES at step SJ-2), the operation word assigning unit 102d assigns k operation words $B_2$ (step SJ-3).

The streamline analyzing unit 102b then performs, on the streamline diagram, an operation of deleting the ∂-saddles, which are at the same boundary and are connected by the ∂-saddle connection, and the boundary and providing a replacement with a closed orbit for k times (step SJ-4).

On the other hand, when there is no one with a ∂-saddle connection connecting to a boundary at which there are just two ∂-saddles and at the boundary (NO at step SJ-2), the operation word assigning unit 102d determines whether or not there is an innermost figure eight (step SJ-5).

When there is one with an innermost figure eight (i.e., ∂-saddle connections, at least one of which encloses a center/disk)(YES at step SJ-5), the operation word assigning unit 102d assigns an operation word $B_0$ and the streamline analyzing unit 102b performs, on the streamline diagram, an operation of providing a replacement with a closed orbit bounding a center/disk (step SJ-6). This operation (operation of assigning an operation word $B_0$ and providing a replacement with a closed orbit) is repeatedly performed as much as possible.

On the other hand, when there is no innermost figure eight (NO at step SJ-5), i.e., when there is a boundary with a ∂-saddle connection that is at a boundary containing at least four ∂-saddles and that encloses a center/disk, the operation word assigning unit 102d assigns an operation word C word and the streamline analyzing unit 102b deletes, on the streamline diagram, the ∂-saddle connection at the boundary, the two ∂-saddles connected by the ∂-saddle connection, and the center/disk bounded by them (step SJ-7). This operation (operation of assigning an operation word C and deleting the center/disk) is repeatedly performed as much as possible.

After the above processing is performed, the processing is returned to step SJ-1 and, when there is still a saddle or a ∂-saddle (YES at step SJ-1), the word representation apparatus 100 repeats the above-described processing.

On the other hand, when there is no more saddle or ∂-saddle (NO at step SJ-1), the word representation apparatus 100 ends the processing for assigning an operation word of the O-system according to the algorithm B (O-word alg). Addition of O to the top of the obtained word sequence leads to a maximal word.

This is the detailed example of the processing according to the algorithm B for calculating a word representation from a streamline diagram (algorithm for subspecies). This allows an appropriate calculation of a word representation corresponding to an arbitrary streamline diagram.

Algorithm A

Detailed descriptions for processing according to the algorithm A for calculating, on the basis of the above-described basic processing, all word representations that can be applied to a multiply connected exterior domain $D_\zeta$ (M) having M+1 holes will be described below with reference to FIGS. 16 to 18.

According to the algorithm A of the embodiment exemplified below, after all word sequences are generated from combinations of pattern words, it is determined whether each word sequence is a maximal word and, if each word sequence is a maximal word, it is written.

In other words, in accordance with constraints for assignment of operation word, it is in principle possible to represent a topological structure of all structurally stable flows by listing operation words. However, it should be noted that "there are multiple words that represent one flow pattern" and that, on the other hand, "there are multiple flow patterns that are represented by one word expression". An example of this can be seen in $IA_0A_2$, $IA_2A_0$, etc. From the point of view of word representation, the latter one is not a significant problem because a word just represents a set (group) of flow patterns. On the other hand, the former is problematic because, when multiple words represent one flow, it is redundant and is very confusing. Then, using a "maximal word representation" can solve the problem.

The maximal word representation is introduced by examining what re-ordering of word sequences representing operations provided by the I system, II system, and the O system brings in the set of the flows represented by the word sequences. For example, regarding the two word representations of words $IA_0A_2$ and $IA_2A_0$, because it is represented that the flow patterns represented by them are the same, exchanging $A_0$ and $A_2$ does not change the patterns to be represented. Thus, a rule defining "$A_0$ should appear before $A_2$ in a word representation" is added to exclude a redundant representation $IA_2A_0$. The change in the patterns represented by the words caused on such exchange of words is represented symbolically by $A_0A_2=A_2A_0$. Combinations that do not, even when the words are exchanging, change the patterns represented by the words are given by Lemma 3.5 and Lemma 3.6.

Expression 8

Lemma 3.5. The streamline patterns with the word representations $O_0O_1 \ldots O_iA_0CO_{i+3} \ldots O_k$ and $O_oO_t \ldots O_iCA_0O_{i+3}$ with $O_0 \in \{I,II\}$ are equivalent. Namely, $A_0$ and C commute in the word representation.

Proof. Since $A_0$ does not increase boundaries with ∂-saddles and C just changes a boundary with ∂-saddles, these operations are independently applied.

Expression 9

Lemma 3.6. The streamline patterns with the word representations $IO_1 \ldots O_1A_2O_{i+2} \ldots O_k$ and $IO_1 \ldots A_2O_1 O_{i+2} \ldots O_k$ with $O_i \in (A_0, B_0, B_2)$ are equivalent.

Proof. Since $A_0$ and $A_2$ are applied to an ss-orbit independently, $A_0$ and $A_2$ commute. The operation $A_2$ increases no closed orbits to which $B_0$ and $B_2$ are applied. Conversely, $B_0$ and $B_2$ add no ss-obits. Hence $B_0$ and $B_2$ commute with $A_2$ On the other hand, exchange of words may change the set of patterns represented by the words. For example, regarding $IB_0A_0$ and $IA_0B_0$, there is an inclusion relation that the set of patterns represented by the former one is included in the set of patterns represented by the latter one. In other words, using a symbol of set, $(IB_0A_0) \subset (IA_0B_0)$ is satisfied. As described above, when an exchange causes an inclusion of a set of patterns in another set of patterns, the included word representation is excluded and only the greater word representation is applied. This relational expression is symbolically represented by $B_0A_0 \le A_0B_0$. A combination of exchange of words leading to such an inclusion relation is given by Lemma 3.7.

Expression 10

Lemma 3.7. The inclusion relations $B_0A_0 \le A_0B_0$, $B_2A_0 \le A_0B_2$, $CA_2 \le A_2C$, $B_2B_0 \le B_0B_2$, $B_0C \le CB_0$ hold for the exchange of two operations in the sequence.

Proof. First, $A_0$ is independently applied to an ss-orbit, even if $B_0$ and $B_2$ exist in the sequence before $A_0$. On the other hand, $A_0$ adds new closed orbits to which $B_0$ and $B_2$ are applied. Hence, we have $B_0A_0 \le A_0B_0$ and $B_2A_0 \le A_0B_2$. Second, C does not affect $A_2$, since C creates no new ss-orbits. Conversely, $A_2$ adds a new boundary with two ∂-saddles to which C can be applied. Thus $CA_2 \le A_2C$ holds. Third, $B_0$ increases new closed orbits to which $B_2$ is applied, but $B_2$ does not. Hence, we have $B_2B_0 \le B_0B_2$. Finally, $CB_0 \ge B_0C$ holds, since C increases new closed orbits and $B_0$ adds no boundary with ∂-saddles.

The following table represents the inclusion relations organized according to the exchange between these words. No inclusion relation is satisfied by the exchange between $B_2$ and C and thus $B_2C \| CB_2$ represents that these two are incomparable.

TABLE 1

|       | $A_0$ | $A_2$ | $B_0$ | $B_2$ | C |
|-------|-------|-------|-------|-------|---|
| $A_0$ | =     | =     | ≤     | ≤     | = |
| $A_2$ |       | =     | =     | =     | ≤ |
| $B_0$ |       |       | =     | ≤     | ≥ |
| $B_2$ |       |       |       | =     | ∥ |
| C     |       |       |       |       | = |

By fixing an appropriate algorithm, it is possible to mathematically prove that, for one pattern, there is only one maximal representation to be obtained by the exchange of the word representations (see Lemma 3.8).

Expression 11

Lemma 3.8. Each structurally stable streamline pattern on $D_\zeta(M)$ has a maximal word representation.

Proof. Notice that the relation ≤ implies that the reflexive and transitive relation on the set of O-words (resp. I-words, II-words). Since the number of O-words (resp. I-words, II-words) is finite, each word is less than or equal to some maximal word.

Furthermore, according to this, a canonical maximal representation can be calculated. Theorem 3.3 provides a canonical maximal representation for the O system, Theorem 3.4 provides a canonical maximal representation for the I system, and Theorem 3.5 provides a canonical maximal representation for the II system.

Expression 12

Theorem 3.3. For any maximal O-word for a structurally stable streamline pattern in $D_\zeta(M)$, there exist integers $k \ge 1$, $s_m, t_m \ge 0$ for $m=1, \ldots, k$ and $u_m > 0$ for $m=1, \ldots, k-1$ such that it is expressed by $$OW(s_1, t_1, u_1) \ldots W(s_{k-1}, t_{k-1}, u_{k-1}) W(s_k, t_k, 0). \quad (2)$$

where $t_m > 0$ for any $m < k$ with $M = 1 + \Sigma_{m=1}^{k-1}(s_m + t_m + u_m) + s_k + t_k$.

Proof. Let us first note that it is unable to exchange $B_0C$ and $B_2C$ in the sequence of any O-word to obtain its maximal O-word owing to $B_2C \| CB_2$ and $B_0C \ge CB_0$. Show that every O-word assigned to the structurally stable streamline pattern in $D_\zeta(M)$ can be reduced to the maximal O-word inductively as follows.

Starting the initial word O, we look for the location where $(C)^{u_{m+1}}$ first appears in the sequence of the O-word. If there exists no operation C in the sequence, i.e., $u_1 = 0$, then the O-word consist of the operations $B_0$ and $B_2$ and thus it can be reduced to $O(B_0)^{s_1}(B_2)^{s_2} = OW(s_1, t_1, 0)$ for some $s_1, t_1 \ge 0$ by exchanging $B_0$ and $B_2$ owing to $B_2B_0 \le B_0B_2$, which ends the proof. On the other hand, if $u_1 \ne 0$, we can rearrange the sequence with $B_0$ and $B_2$ between O and $(C)^{u_1}$ by the block component $W(s_1, t_1, u_1)$ for some $t_1 > 0$. This is because if $t_1 = 0$ we have $O(B_0)^{u_1}(C)^{s_1} \ldots \ge O(C)^{u_1}(B_0)^{s_1} \ldots$ owing to $(B_0)^{s_1}(C)^{u_1} \ge (C)^{u_1}(B_0)^{s_1}$, which is not an O-word. Hence the O-word is expressed as $OW(s_3, t_3, u_3) \ldots$ with $t_1, u_1 > 0$.

Now suppose that $u_m \ne 0$ and the O-word is reduced to $OW(s_1, t_1, u_1) \ldots W(s_m, t_m, u_m) \ldots$ with $t_i > 0$ for any $i \le m$. Then we look for the location of $(C)^{u_{m+1}}$ in the sequence beyond $W(s_m, t_m, u_m)$. If $u_{m+1} = 0$, then the O-word can be reduced to $$OW(s_1, t_1, u_1) \ldots W(s_m, t_m, u_m) W(s_{m+1}, t_{m+1}, 0)$$

for some $s_{m+1}, t_{m+1} \ge 0$ by exchanging $B_0$ and $B_2$, which finishes the proof. Otherwise the sequence of $B_0$ and $B_2$ between $W(s_m, t_m, u_m)$ and $(C)^{u_{m+1}}$ is reduced to the block component $W(s_{m+1}, t_{m+1}, u_{m+1})$ for some $s_{m+1} \ge 0$ and $t_{m+1} > 0$. The positivity of $t_{m+1}$ is assured as follows. If $t_{m+1} = 0$, we have $$OW(s_1, t_1, u_1) \ldots W(s_m, t_m, u_m)(B_0)^{s_{m+1}}(C)^{u_{m+1}} \ldots$$
$$\le OW(s_1, t_1, t_1) \ldots W(s_m, t_m, u_m + u_{m+1})$$
$$(B_0)^{s_{m+1}} \ldots$$

owing to $B_0C \le CB_0$. Then with $ü_m = u_m + u_{m+1}$, the sequence is reduced to $$OW(s_1, t_1, u_1) \ldots W(s_m, t_m, ü_m) \ldots$$

for which we can repeat the process again.

Expression 13

Theorem 3.4. Let p, q, r be non-negative integers. Then, for any maximal I-word for a structurally stable streamline pattern in $D_\zeta(M)$, there exist integers $k \ge 1$, $s_m, t_m \ge 0$ for $n=1, \ldots, k$ and $u_m > 0$ for $m=1, \ldots, k-1$ such that it is expressed by $$I(A_0)^p(A_2)^q(C)^r W(s_1, t_1, u_1) \ldots W(s_{m-1}, t_{m-1}, u_{m-1})$$
$$W(s_m, t_m, 0). \quad (3)$$

where $t_m > 0$ for any $m < k$ with $M = p + q + r + \Sigma_{m-1}^{k-1}(s_m + t_m + u_m) + s_k + t_k$, if $p + r > 0$. Otherwise it is represented by $I(A_2)^q$ with $M = q$.

Proof. For a given I-word representing a structurally stable streamline pattern in $D_\zeta(M)$, we can move all $A_0$ and $A_2$ in the sequence of operations before $B_0$, $B_2$ and C by exchanging the order of the operations owing to $A_0A_2 = A_2A_0$, $CA_2 \le A_2C$, $B_2a_2 = A_2B_2$, $B_0A_2 = A_2B_0$, $CA_0 = A_0C$, $B_0A_0 \le A_0B_0$ and $B_2A_0 \le A_0B_2$. Hence, the I-word is reduced to $I(A_0)^p(A_2)^q O_{p+q+1} \ldots O_M$ for some p, $q \ge 0$, in which $O_i \in \{B_0, B_2, C\}$ for $p + q < i \le M$.

Suppose first that $p = 0$. If $O_{q+1} \ne C$, namely $r = 0$, then there contains no $B_0$ and $B_2$ in the following sequence, since they cannot be applied without $A_0$ or C in the sequence of I-words due to Lemma 3.3. Hence, if $p + r = 0$, the I-word is represented by $I(A_2)^q$ and $M = q$. On the other hand, if $O_{q+3} = C$, then there exists r>0 such that the I-word is represented by $I(A_2)^q(C)^rO_{q+r+3} \ldots O_M$ in which $O_i \in \{B_0, B_2, C\}$ for $q+r<i \leq M$. The remaining sequence $O_{q+r+1} \ldots O_M$ can be reduced to some block components of $B_0$, $B_2$ and C with using the same procedure as for O-words in Theorem 3.3. That is to say, there exist integers $k \geq 1$, $s_m$, $t_m \geq 0$ for $m=1, \ldots, k$ and $u_m > 0$ for $m=1, \ldots, k-1$ such that the I-word is expressed by $$I(A_2)^q(C)^rW(s_1, t_1, u_1) \ldots W(s_{k-1}, t_{k-1}, u_{k-1})W(s_k, t_k, 0), ps$$

where $t_m > 0$ for any $m < k$. This is the maximal expression for the I-word for $p=0$ and $r>0$.

Next we assume $p \neq 0$. Then $B_0$ and $B_2$ can exist in the remaining part of the sequence $I(A_0)^p(A_2)^q \ldots$ to which we can apply the same procedure for the remaining sequence of $B_0$, $B_2$ and C as used for O-words. Hence we have the maximal expression (3)

Expression 14

Theorem 3.5. Let p be a non-negative integer. Then, for any maximal II-word for a structurally stable streamline pattern in $D_\xi(M)$, there exist integers $k \geq 1$, $s_m$, $t_m \geq 0$ for $m=1, \ldots, k$ and $u_m > 0$ for $m=1, \ldots, k-1$ such that it is expressed by $$II(A_0)^pW(s_1, t_1, u_1) \ldots W(s_{m-1}, t_{m-1}, u_{m-1})W(s_m, t_m, 0). \quad (4)$$

where $t_m > 0$ for any $m < k$ with $M = p + \sum_{m=1}^{k-1}(s_m + t_m + u_m) + s_k + t_k$.

Proof. The proof is done similarly as in Theorem 3.4, since Lemma 3.4 indicates that II words have the same rule as O words in terms of the order of operations $B_0$, $B_2$ and C in the sequence.

The algorithm A for, according to the above-described theories, determining whether or not a word sequence is a maximal word and, when it is a maximal word representation, writing the word sequence will be specifically described with reference to the drawings.

A-1. Processing for Determining Maximal Word of I System

First, processing for determining a maximal word of the I system will be described first. FIG. 16 is a flowchart showing an example of the processing according to the algorithm A for the I system.

Figure 16:
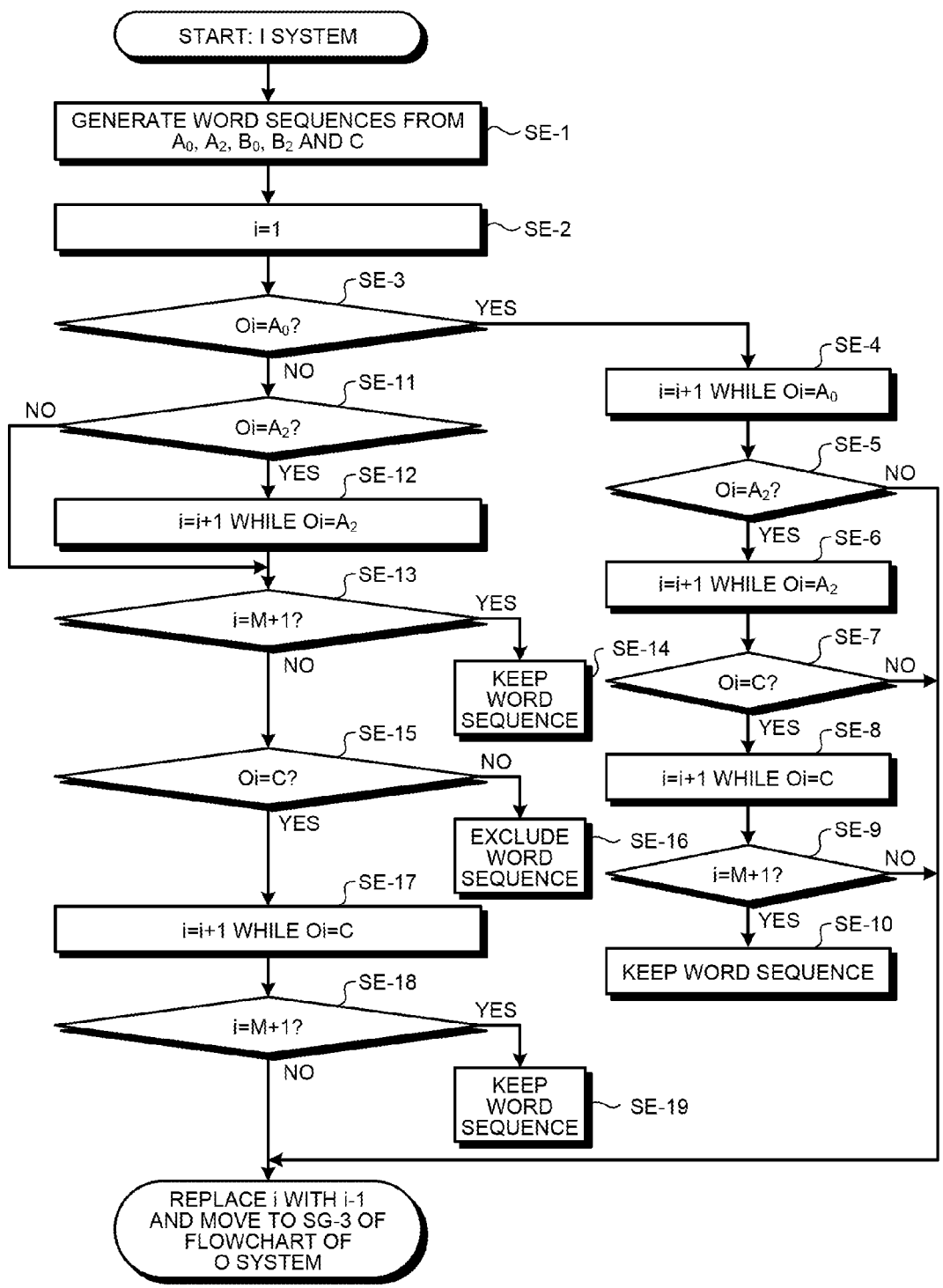
FIG. 16 is a flowchart showing an example of processing according to the algorithm A for the I system.

As shown in FIG. 16, the operation word assigning unit 102*d* first generates word sequences O1, O2, . . . OM having a length of M from $A_0$, $A_2$, $B_0$, $B_2$ and C (step SE-1). M sets of five types of pattern words are arranged, which leads to $5^M$ arrangements.

The maximal word representation unit 102*e* sets 1 for a word position i on which a determination is to be made from among the word sequence (step SE-2).

The maximal word representation unit 102*e* determines whether or not a word Oi on which a determination is to be made is $A_0$ (step SE-3).

When the word Oi on which a determination is to be made is $A_0$ (YES at step SE-3), as long as Oi=$A_0$, the maximal word representation unit 102*e* increments the word position i on which a determination is to be made (step SE-4).

The maximal word representation unit 102*e* determines whether or not the word Oi on which a determination is to be made is $A_2$ (step SE-5).

When the word Oi on which a determination is to be made is $A_2$ (YES at step SE-5), as long as Oi=$A_2$, the maximal word representation unit 102*e* increments the word position i on which a determination is to be made.

The maximal word representation unit 102*e* determines whether or not the word Oi on which a determination is to be made is C (step SE-7).

When the word Oi on which a determination is to be made is C (YES at step SE-7), as long as Oi=C, the maximal word representation unit 102*e* increments the word position i on which a determination is to be made (step SE-8).

When the word position i has reached M+1 (YES at step SE-9), the maximal word representation unit 102*e* keeps the word sequence as a maximal word and writes it in the word representation file 106*c* (step SE-10).

On the other hand, when the word Oi on which a determination is to be made is not $A_2$ (NO at step SE-5), when the word Oi on which a determination is to be made is not C (NO at step SE-7), or when the word position i has not reached M+1 (NO at step SE-9), i is replaced with i-1 and, for all the remaining word sequence, Oj is replaced with Oj-1 and then it moves to SG-3 of the flowchart of the O-system.

At step SE-3, when the word Oi on which a determination is to be made is not $A_0$ (NO at step SE-3), the maximal word representation unit 102*e* determines whether or not the word Oi on which a determination is to be made is $A_2$ (step SE-11) and, as long as Oi=$A_2$, increments the word position i on which a determination is to be made (step SE-12). When the word Oi on which a determination is to be made is not $A_2$ (NO at step SE-11), it directly moves to the next processing.

The maximal word representation unit 102*e* determines whether or not the word position i has reached M+1 (step SE-13) and, when the word position i has reached M+1 (YES at step SE-13), keeps the word sequence as a maximal word (step SE-14).

On the other hand, when the word position i has not reached M+1 (NO at step SE-13), the maximal word representation unit 102*e* determines whether or not the word Oi on which a determination is to be made is C (step SE-15). When the word Oi on which a determination is to be made is not C (NO at step SE-15), the word sequence is excluded (step SE-16).

When the word Oi on which a determination is to be made is C (YES at step SE-15), as long as Oi=C, the maximal word representation unit 102*e* increments the word position i on which a determination is to be made (step SE-17).

It is then determined whether or not the word position i has reached M+1 (step SE-18) and, when the word position i has reached M+1 (YES at step SE-18), the word sequence is kept as a maximal word (step SE-19).

On the other hand, when the word position i has not reached M+1 (NO at step SE-18), i is replaced with i-1 and, for all the remaining word sequence, Oj is replaced with Oj-1 and it moves to step SG-3 of the flowchart of the O system.

A-2. Processing for Determining Maximal Word of II System

Processing for determining a maximal word of the II system will be described below. FIG. 17 is a flowchart showing an example of the processing according to the algorithm A for the II system.

Figure 17:
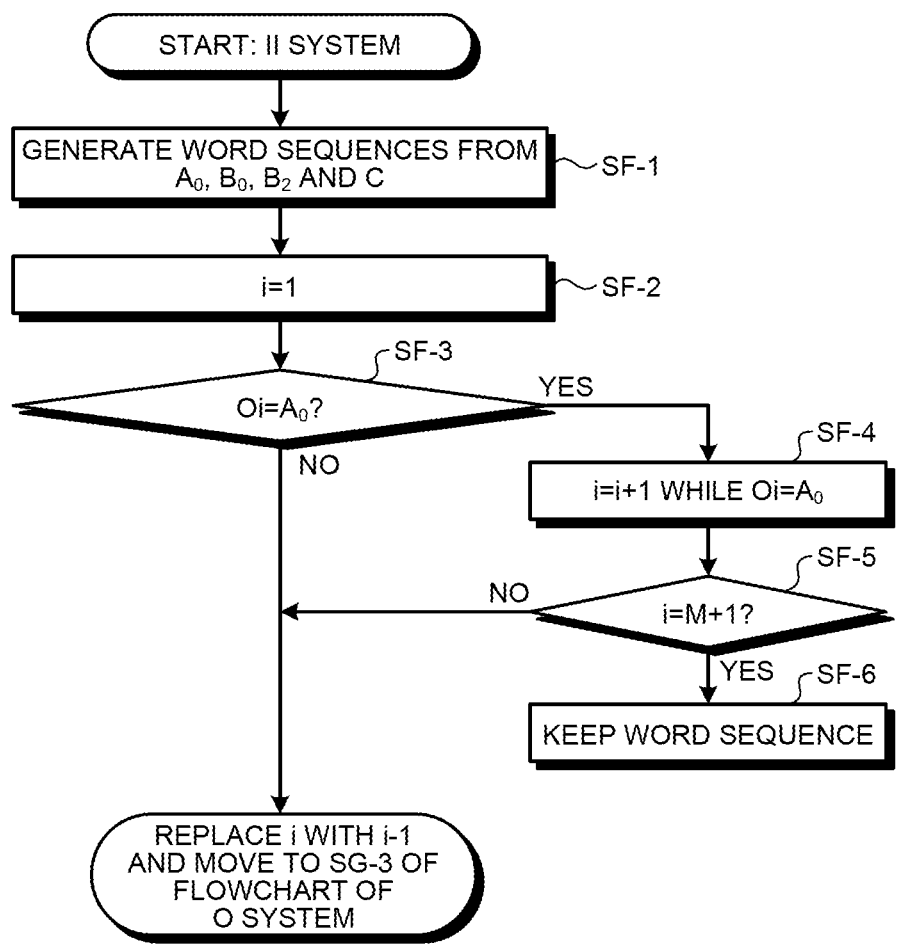
FIG. 17 is a flowchart showing an example of processing according to the algorithm A for the II system.

As shown in FIG. 17, the operation word assigning unit 102*d* first generates word sequences O1, O2, . . . OM having a length of M from $A_0$, $B_0$, $B_2$ and C (step SF-1). M sets of four types of pattern words are arranged, which leads to $4^M$ word sequences.

The maximal word representation unit 102*e* sets 1 for a word position i on which a determination is to be made from among the word sequence (step SF-2).

The maximal word representation unit 102*e* determines whether or not the word Oi on which a determination is to be made is $A_0$ (step SF-3).

When the word Oi on which a determination is to be made is $A_0$ (YES at step SF-3), as long as Oi=$A_0$, the maximal word representation unit 102e increments the word position i on which a determination is to be made (step SF-4).

It is determined whether or not the word position i has reached M+1 (step SF-5) and, when the word position i has reached M+1 (YES at step SF-5), the word sequence is kept as a maximal word (step SF-6).

On the other hand, when the word position i has not reached M+1 (NO at step SF-5) or when the word Oi on which a determination is to be made is not $A_0$ at step SF-3 (NO at step SF-3), i is replaced with i-1 and, for all the remaining word sequence, Oj is replaced with Oj-1 and then it moves to SG-3 of the flowchart of the O system.

A-3. Processing for Determining Maximal Word of O System

Lastly, processing for determining a maximal word of the O system will be described below. FIG. 18 is a flowchart showing an example of the processing according to the algorithm A for the O system.

Figure 18:
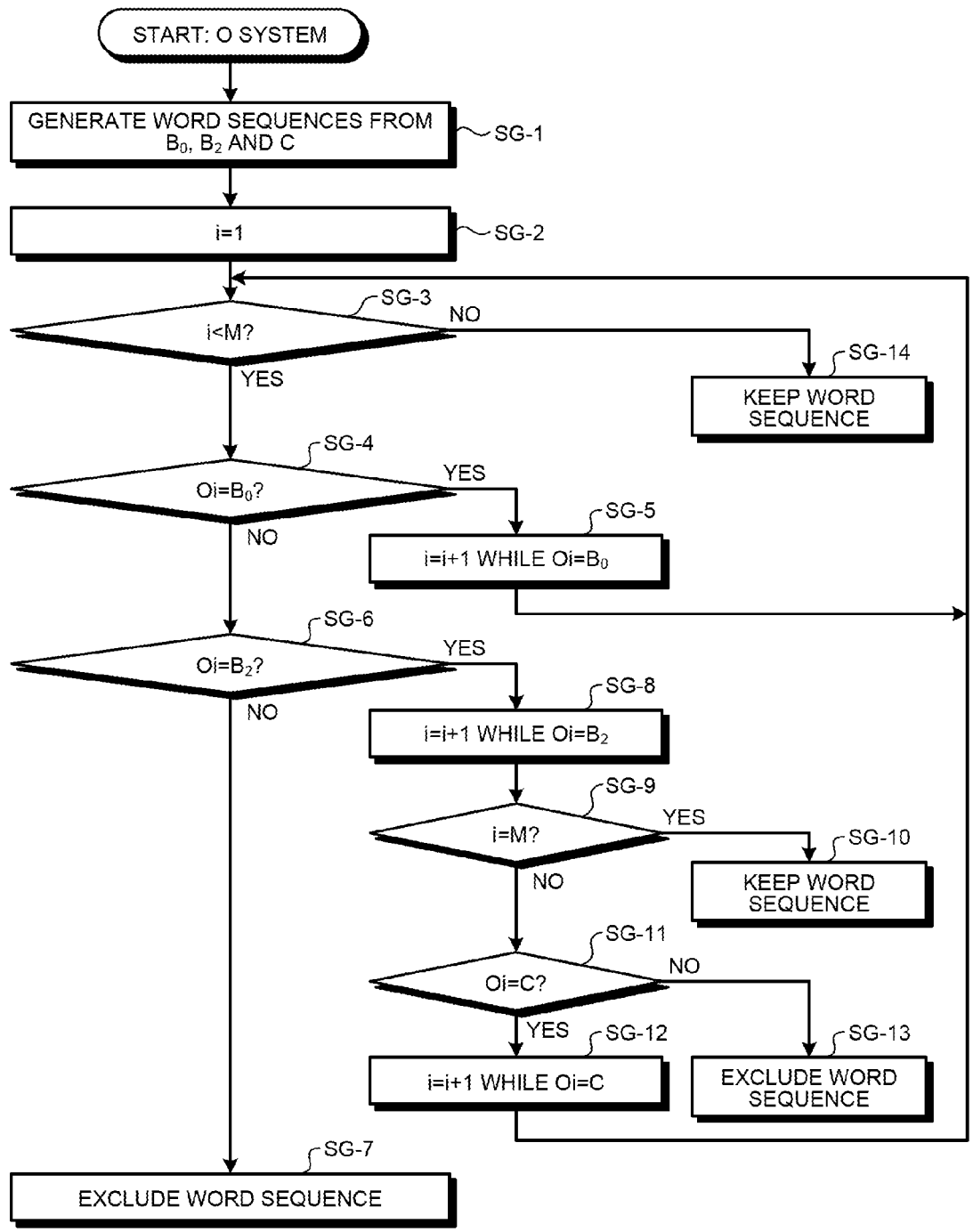
FIG. 18 is a flowchart of an example of processing according to the algorithm A for the O system.

As shown in FIG. 18, the operation word assigning unit 102d first generates word sequences having a length of M-1 from $B_0$, $B_2$ and C (step SG-1). (M-1) sets of three types of pattern words are arranged, which leads to $3^{M-1}$ word sequences.

The maximal word representation unit 102e sets 1 for a word position i on which a determination is to be made from among the word sequence (step SG-2).

The maximal word representation unit 102e determines whether or not the word position i is under M (step SG-3). When the word position reaches M (NO at step SG-3), the word sequence is maintained as a maximal word (step SG-14).

When the word position i is under M (YES at step SG-3), the maximal word representation unit 102e determines whether or not the word Oi on which a determination is to be made is $B_0$ (step SG-4).

When the word Oi on which a determination is to be made is $B_0$ (YES at step SG-4), as long as Oi=$B_0$, the maximal word representation unit 102e increments the word position i on which a determination is to be made (step SG-5) and returns the processing to step SG-3 to repeat the above-described processing.

On the other hand, when the word Oi on which a determination is to be made is not $B_0$ (No at step SG-4), the maximal word representation unit 102e determines whether or not the word Oi on which a determination is to be made is $B_2$ (step SG-6).

When the word Oi on which a determination is to be made is not $B_2$ (NO at step SG-6), the maximal word representation unit 102e determines that the word sequence is not a maximal word and excludes it (step SG-7).

On the other hand, when the word Oi on which a determination is to be made is $B_2$ (Yes at step SG-6), as long as Oi=$B_2$, the maximal word representation unit 102e increments the word position i on which a determination is to be made (step SG-8).

It is determined whether or not the word position i has reached M (step SG-9) and, when the word position i has reached M (YES at step SG-9), the maximal word representation unit 102e keeps the word sequence as a maximal word (step SG-10).

On the other hand, when the word position i has not reached M (NO at step SG-9), the maximal word representation unit 102e determines whether or not the word Oi on which a determination is to be made is C (step SG-11).

When the word Oi on which a determination is to be made is not C (NO at step SG-11), the maximal word representation unit 102e determines that the word sequence is not a maximal word and excludes it (step SG-13).

On the other hand, when the word Oi on which a determination is to be made is C (YES at step SG-11), as long as Oi=C, the maximal word representation unit 102e increments the word position i on which a determination is to be made (step SG-12) and returns the processing to step SG-3 to repeat the above-described processing.

This is the example of the processing according to the algorithm A involving determination of a maximal word representation. This makes it possible to, list all flow patterns that can be applied to a multiply connected exterior domain $D_\xi$ (M) having an arbitrary number M+1 of holes by word sequences without redundancy.

For example, the embodiment can be used for designing a bridge. First, the number of bridges is determined and, according to the above-describe algorithm A, flow patterns that can be caused at that time can be calculated. Next, for bridge designing, various sets of data are obtained in advance through simulations by numerical calculations or model measurements in a test room and then the data are visualized or processed by a calculator etc. to represent it as a snapshot that captures flows, i.e., a streamline diagram. Inputting it to the above-described algorithm B makes it is possible to know, to which of ones calculated according to the algorithm A, it corresponds.

Conventionally, when an optimum flow state is designed by changing the arrangement to perform optimum bridge designing through various trials and errors, it is not possible to argue in advance that whether all cases are served and which arrangement of them is the most desirable one for the flow after the bridge designing. According to the embodiment, the algorithm A makes it possible to know all flow patterns and the algorithm B makes it possible to know whether what maximal word representations the obtained patterns have and accordingly, via the most effective word representations of the arrangement change to return to a desired pattern, the steps for optimum bridge designing that is performed through trial and error are significantly reduced.

As for setting of oil fences, similarly, the number of fences is input and all flow patterns that can be implemented in that case are written according to the algorithm A, which makes it possible to immediately determine feasible flows that can be implemented in order to efficiently collect oil. When an optimum arrangement is determined through trial and error by performing measurements of surrounding sea currents, numerical simulations, and tests, the obtained results of the test measurements and simulations are written as a streamline diagram and, by inputting it to the algorithm B, a word representation can be obtained. Confirming to which ones of the flows calculated according to the algorithm A the word representation corresponds and how much it is close to desired flows allows optimization through the shortest searching.

In a conventional technology, even all patterns that can occur are not known and only local optimization in a limited area on proper condition is performed. However, according to the embodiment, it is possible to know in advance all patterns and a word representation thereof and, by knowing a word representation that represents the current state, it is possible to effectively implement optimization of a large area. Accordingly, it makes it possible to calculate an optimum state of an interaction between an arrangement of objects, such as rivers, oceans, and airplanes, and flows in a short time and at low costs. By specifying a flow pattern according to an object, labor saving in structure designing can be implemented.

Other Embodiments

The embodiment of the present invention has been described above, and the present invention can be carried out by, in addition to the above-described embodiment, various different embodiments within the scope of the technical idea described in the claims.

For example, while the example has been given described where the word representation apparatus 100 performs the processing in a stand-alone mode, the word representation apparatus 100 may perform the processing in response to a request from a client terminal and return the processing result to the client terminal.

Moreover, among the steps of the processing described in the embodiment, all or part of the steps of the processing described as ones automatically performed may be performed manually and all or part of the steps of the processing described as ones manually performed may be performed automatically by well-known methods.

In addition to this, the processing procedures, control procedures, specific names, information including registered data of each set of processing and parameters, such as retrieval conditions, screen examples, and database configurations, described in the literatures and drawings above may be arbitrarily changed unless otherwise noted.

Furthermore, each component of the word representation apparatus 100 illustrated in the drawings is of a functional concept and is not necessarily configured physically as illustrated in the drawings.

For example, all or any part of the processing functions that the devices in the word representation apparatus 100 have, and particularly each processing function performed by the control unit 102, may be implemented by a CPU (Central Processing Unit) and a program interpreted and executed by the CPU, or may be implemented as hardware using a wired logic. The program is recorded in a recording medium to be described below and is mechanically read by the word representation apparatus 100 as necessary. Specifically, the storage unit 106, such as a ROM and an HD, or the like records a computer program for giving instructions to the CPU in cooperation with the OS (Operating System) to perform various types of processing. This computer program is downloaded to a RAM and accordingly executed to configure the control unit 102 in cooperation with the CPU.

Moreover, this computer program may be stored in an application program server that is connected to the word representation apparatus 100 via the arbitrary network 300, and all or part thereof may be downloaded as necessary.

Furthermore, the program according to the present invention may be stored in a computer-readable recording medium and may be configured as a program product. The "recording medium" includes any "portable physical medium", such as a memory card, USB memory, SD card, flexible disk, magneto-optical disk, ROM, EPROM, an EEPROM, CD-ROM, MO, DVD, and Blu-ray (Trademark) Disc.

Moreover, the "program" refers to a data processing method written in any language and by any description method, and is not limited to a specific format, such as source codes and binary codes. The "program" is not necessarily configured unitarily and includes a program configured in a dispersed manner as multiple modules and libraries and a program that implements its functions in cooperation with a different program represented by an OS (Operating System). Well-known configurations and procedures can be used for the specific configuration for each device shown in the embodiment to read the recording medium, the reading procedure, or the installation procedure after the reading, and the like.

Various databases and the like (the simulation result file 106a, the streamline diagram file 106b, the word representation file 106c, etc.) stored in the storage unit 106 are storage units, examples of which are a memory device, such as a RAM or a ROM, a fixed disk device, such as a hard disk, a flexible disk, and an optical disk, and store therein various programs, tables, databases, files for web pages, and the like that are used for various types of processing and providing websites.

Moreover, the word representation apparatus 100 may be configured as an information processing apparatus, such as a well-known personal computer or workstation, or may be configured by connecting any peripheral device to the information processing apparatus. Moreover, the word representation apparatus 100 may be implemented by installing software (including program and data) that causes the information processing apparatus to implement the method according to the present invention.

Furthermore, specific modes of distribution/integration of the devices are not limited to those illustrated in the drawings, and all or a part thereof can be configured by functionally or physically distributing or integrating them in any unit according to various additions or the like, or according to functional loads. In other words, the above-described embodiment may be implemented by any combination or the embodiment may be selectively performed.

INDUSTRIAL APPLICABILITY

As described in detail above, the present invention can provide a method for a word representation of a flow pattern, an apparatus for a word representation, and a program that allows, when a structure in a flow field is designed, to easily deal with flow patterns that can be applied to the structure without depending on experiences or intuition. For example, it is extremely useful in various fields involving designing and arranging of structures, such as designing of bridges, arrangement of a breakwater, removal of contaminants at harbors, designing of blades for wind power generation, a structure of a pantograph of a train, and optimum arrangement of oil fences. It is also possible to apply it to a field, such as kinetics, for designing of structures of sports goods.

REFERENCE SIGN LIST

100 WORD REPRESENTATION APPARATUS
102 CONTROL UNIT
102a SIMULATION UNIT
102b STREAMLINE ANALYZING UNIT
102c PATTERN WORD ASSIGNING UNIT
102d OPERATION WORD ASSIGNING UNIT
102e MAXIMAL WORD REPRESENTATION UNIT
104 COMMUNICATION CONTROL INTERFACE UNIT
106 STORAGE UNIT
106a SIMULATION RESULT FILE
106b STREAMLINE DIAGRAM FILE
106c WORD REPRESENTATION FILE
108 INPUT/OUTPUT CONTROL INTERFACE UNIT
112 INPUT DEVICE

114 OUTPUT DEVICE
200 EXTERNAL SYSTEM
300 NETWORK

The invention claimed is:

1. A device for generating a word representation of a streamline diagram of a simulated structure, the streamline diagram forming a multiply connected exterior domain having N holes topologically, the device comprising a processor and a memory,
the memory stores:
pattern words that define two types of flow patterns that can be topologically applied to a simply connected exterior domain having one hole; and
operation words that define five types of operations that can be topologically applied to add one hole to the two types of flow patterns,
the processor performs:
a pattern word assigning step of assigning, according to a pattern included in a simply connected exterior domain having one hole of the streamline diagram, any one of the pattern words that corresponds to the pattern; and
an operation word assigning step of assigning, according to a pattern included in a multiply connected exterior domain having the one hole and another one hole of the streamline diagram, any one of the operation words that corresponds to the pattern, and repeatedly performing the operation word assigning for the other holes of the streamline diagram, so that a word representation corresponding to the multiply connected exterior domain having N holes is produced.

2. The device according to claim 1, wherein
the memory stores pattern words defining three types of flow patterns in total consisting of the two types of flow patterns that can be topologically applied to a simply connected exterior domain having one hole and a pattern without a source-sink pair in a doubly connected exterior domain having two holes,
the pattern word assigning step assigns, according to a pattern included in a simply connected exterior domain having one hole of the streamline diagram, any one of words defining three types that corresponds to the pattern.

3. The device according to claim 2, wherein
the three types of flow patterns in total are:
1) a pattern I with the source-sink pair and two ss-∂-saddle connections;
2) a pattern II with the source-sink pair, a saddle point, a homoclinic saddle connection connecting to the saddle point, and two ss-saddle connections; and
3) a pattern O without the source-sink pair.

4. The device according to claim 3, wherein
the pattern word assigning step includes:
a I classification step of determining whether or not there is an ss-∂-saddle connection in the simply connected exterior domain having one hole of the streamline diagram and assigning a pattern word of the pattern I when there is an ss-∂-saddle connection; and
a II/O classification step of determining whether or not there is an ss-saddle connection in the simply connected exterior domain having one hole of the streamline diagram when there is no ss-∂-saddle connection at the I classification step, assigning a word of the pattern II when there is an ss-saddle connection, and assigning a pattern word of the pattern O when there is no ss-saddle connection on the other hand.

5. The device according to claim 1, wherein the five types of operations that can be topologically applied are:

1) an $A_0$ operation of replacing an ss-orbit with a saddle point, a homoclinic saddle connection connecting to the saddle point and enclosing a hole, and two ss-saddle connections;
2) an $A_2$ operation of replacing an ss-orbit with two ss-∂-saddle connections and two ∂-saddles at a boundary newly added;
3) a $B_0$ operation of replacing a closed orbit with two homoclinic orbits forming a figure eight with addition of a hole and a saddle point;
4) a $B_2$ operation of replacing a closed orbit with an orbit with a ∂-saddle connection connecting two ∂-saddles added at a boundary of a hole newly added; and
5) a C operation of newly adding two ∂-saddles at a boundary already with 2k (k>0) ∂-saddles and connecting the two ∂-saddles with a ∂-saddle connection to enclose a hole newly added.

6. The device according to claim 5, wherein, when assigning the operation words defining the five types of operations, the operation word assigning step:
1) assigns the operation word defining any one of the $A_0$ operation and the $A_2$ operation on condition that there is an ss-orbit;
2) assigns the operation word defining any one of the $B_0$ operation and the $B_2$ operation on condition that there is a closed orbit; and
3) assigns the operation word defining the C operation on condition that there is a boundary with ∂-saddles.

7. A non-transitory computer-readable medium comprising computer readable program codes, performed by a computer, the program codes when executed causing the computer to execute a method for generating a word representation of a streamline diagram of a simulated structure, the streamline diagram forming a multiply connected exterior domain having N holes topologically, the method comprising:
a pattern word assigning step of assigning, according to a pattern included in a simply connected exterior domain having one hole of the streamline diagram, any one of pattern words that corresponds to the pattern, the pattern words defining two types of flow patterns that can be topologically applied to a simply connected exterior domain having one hole, and
an operation word assigning step of assigning, according to a pattern included in a multiply connected exterior domain having the one hole and another one hole of the streamline diagram, any one of the operation words that corresponds to the pattern, the operation words defining five types of operations that can be topologically applied to add one hole to the two types of flow patterns, and repeatedly performing the operation word assigning for the other holes of the streamline diagram, so that a word representation corresponding to the multiply connected exterior domain having N holes is produced.

8. A non-transitory computer-readable medium comprising computer readable program codes, performed by a computer, the program codes when executed causing the computer to execute a method for generating a word representation of a streamline diagram of a simulated structure, the streamline diagram forming a multiply connected exterior domain having N holes topologically, the method comprising:
an operation word assigning step of assigning, according to a pattern included in a multiply connected exterior domain having one hole and another one hole of the streamline defining five types of operations that can be topologically applied to add one hole to the two types of flow patterns, and repeatedly performing the operation word assigning for the other holes of the streamline diagram, so that a word representation corresponding to the multiply connected exterior domain having N holes is produced; and a pattern word assigning step of assigning, according to a pattern included in a simply connected exterior domain having the one hole of the streamline diagram, any one of pattern words that corresponds to the pattern, the pattern words that define two types of flow patterns that can be topologically applied to a simply connected exterior domain having one hole.

9. A device for generating a word representation of a streamline diagram of a simulated structure, the streamline diagram forming a multiply connected exterior domain having N holes topologically, the device comprising a processor and a memory, the memory stores:
pattern words that define two types of flow patterns that can be topologically applied to a simply connected exterior domain having one hole; and
operation words that define five types of operations that can be topologically applied to add one hole to the two types of flow patterns, the processor performs:
an operation word assigning step of assigning, according to a pattern included in a multiply connected exterior domain having one hole and another one hole of the streamline diagram, any one of the operation words that corresponds to the pattern, and repeatedly performing the operation word assigning for the other holes of the streamline diagram, so that a word representation corresponding to the multiply connected exterior domain having N holes is produced; and a pattern word assigning step of assigning, according to a pattern included in a simply connected exterior domain having the one hole of the streamline diagram, any one of the pattern words that corresponds to the pattern.

10. A method for generating a word representation of a streamline diagram of a simulated structure, performed by a processor, the streamline diagram forming a multiply connected exterior domain having N holes topologically, the method comprising:

a pattern word assigning step of assigning, according to a pattern included in a simply connected exterior domain having one hole of the streamline diagram, any one of pattern words that corresponds to the pattern, the pattern words defining two types of flow patterns that can be topologically applied to a simply connected exterior domain having one hole; and an operation word assigning step of assigning, according to a pattern included in a multiply connected exterior domain having the one hole and another one hole of the streamline diagram, any one of the operation words that corresponds to the pattern, the operation words defining five types of operations that can be topologically applied to add one hole to the two types of flow patterns, and repeatedly performing the operation word assigning for the other holes of the streamline diagram, so that a word representation corresponding to the multiply connected exterior domain having N holes is produced.

11. A method for generating a word representation of a streamline diagram of a simulated structure, performed by a processor, the streamline diagram forming a multiply connected exterior domain having N holes topologically, the method comprising, an operation word assigning step of assigning, according to a pattern included in a multiply connected exterior domain having the one hole and another one hole of the streamline diagram, any one of the operation words that corresponds to the pattern, the operation words defining five types of operations that can be topologically applied to add one hole to the two types of flow patterns, and repeatedly performing the operation word assigning for the other holes of the streamline diagram, so that a word representation corresponding to the multiply connected exterior domain having N holes is produced; and a pattern word assigning step of assigning, according to a pattern included in a simply connected exterior domain having the one hole of the streamline diagram, any one of pattern words that corresponds to the pattern, the pattern words defining two types of flow patterns that can be topologically applied to a simply connected exterior domain having one hole.

* * * * *